US012786421B2

(12) United States Patent
Gao et al.

(10) Patent No.: US 12,786,421 B2
(45) Date of Patent: Nov. 3, 2026

(54) ENCODER, A DECODER AND CORRESPONDING METHODS USING INTRA BLOCK COPY (IBC) DEDICATED BUFFER AND DEFAULT VALUE REFRESHING FOR LUMA AND CHROMA COMPONENT

(71) Applicant: HUAWEI TECHNOLOGIES CO., LTD., Shenzhen (CN)

(72) Inventors: Han Gao, Munich (DE); Semih Esenlik, Munich (DE); Biao Wang, Munich (DE); Anand Meher Kotra, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/897,216

(22) Filed: Aug. 28, 2022

(65) Prior Publication Data

US 2023/0007273 A1 Jan. 5, 2023

Related U.S. Application Data

(63) Continuation of application No. 17/141,147, filed on Jan. 4, 2021, now Pat. No. 11,463,709, which is a (Continued)

(30) Foreign Application Priority Data

Jun. 13, 2019 (WO) ................. PCT/EP2019/065540

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/139* (2014.11); *H04N 19/176* (2014.11); *H04N 19/96* (2014.11)

(58) Field of Classification Search
CPC .. H04N 19/159; H04N 19/105; H04N 19/139; H04N 19/176; H04N 19/96;
(Continued)

(56) References Cited

U.S. PATENT DOCUMENTS

2006/0291566 A1* 12/2006 Mehta .................. H04N 19/423
375/E7.176
2016/0241875 A1 8/2016 Wu et al.
(Continued)

FOREIGN PATENT DOCUMENTS

CN 105532000 A 4/2016
CN 106464905 A 2/2017
(Continued)

OTHER PUBLICATIONS

Han Gao et al., "Bitstream conformance with a virtual IBC buffer concept", Joint Video Experts Team (JVET) of ITU-T SG 16 WP 3 and ISO/IEC JTC 1/SC 29/WG 11,15th Meeting: Gothenburg, SE, Jul. 3-12, 2019, Document: JVET-O1171-v1, total:8pages.
(Continued)

*Primary Examiner* — Joseph W Becker

(57) ABSTRACT

A method of coding implemented by a decoding device, comprising initializing a dedicated buffer for intra block copy (IBC) referencing, when a current coding tree unit (CTU) to be decoded is a first CTU of a CTU row, determining whether a current block in the current CTU is predicted using IBC mode, obtaining an IBC block vector for the current block when the current block is predicted using IBC mode, and obtaining predicted sample values for the current block, based on reference samples from the
(Continued)

dedicated buffer and the IBC block vector for the current block.

9 Claims, 20 Drawing Sheets

Related U.S. Application Data continuation of application No. PCT/CN2020/090053, filed on May 13, 2020.

(60) Provisional application No. 62/849,119, filed on May 16, 2019.

(51) Int. Cl.
*H04N 19/139* (2014.01)
*H04N 19/176* (2014.01)
*H04N 19/96* (2014.01)

(58) Field of Classification Search
CPC .... H04N 19/593; H04N 19/423; H04N 19/11; H04N 19/186; H04N 19/122
See application file for complete search history.

(56) References Cited

U.S. PATENT DOCUMENTS

| | | | | |
|---|---|---|---|---|
| 2016/0360210 | A1 | 12/2016 | Xiu et al. | |
| 2017/0280159 | A1 | 9/2017 | Xu et al. | |
| 2018/0103260 | A1 | 4/2018 | Chuang et al. | |
| 2020/0037002 | A1* | 1/2020 | Xu | H04N 19/44 |
| 2020/0236366 | A1* | 7/2020 | Xu | H04N 19/91 |
| 2020/0236384 | A1* | 7/2020 | Xu | H04N 19/11 |
| 2021/0368162 | A1* | 11/2021 | Heo | H04N 19/105 |

FOREIGN PATENT DOCUMENTS

| | | | |
|---|---|---|---|
| CN | 106797479 | A | 5/2017 |
| CN | 107925769 | A | 4/2018 |
| CN | 109076210 | A | 12/2018 |
| RU | 2613738 | C2 | 3/2017 |
| RU | 2628215 | C2 | 8/2017 |
| WO | 2017041692 | A1 | 3/2017 |
| WO | 2018064948 | A1 | 4/2018 |
| WO | 2020163029 | A1 | 8/2020 |

OTHER PUBLICATIONS

Gary Sullivan et al., Meeting Report of the 11th meeting of the Joint Video Experts Team (JVET),Ljubljana, SI, JVET-K1000-v1,Jul. 10-18, 2018, 290 pages.

Xu (Bytedance) J et al: "Non-CE8: On IBC reference buffer design", 14. JVET Meeting; Mar. 19-Mar. 27, 2019.Geneva; (The Joint Video Exploration Team of 1S0/IEC JTC1/SC29/WG11 and ITU-T SG. 16), No. JVET-N0472 Mar. 22, 2019 (Mar. 22, 2019), XP030204504, Retrieved from the Internet: URL:http://phenix.int-evry.fr/jvet/doc_end_user/documents/14_Geneva/wg11 /JVET-N0472-v2.zip, JVET-N0472.pptx, 9 pages.

Han Gao et al., CE8-related: Dedicated IBC reference buffer without bitstream restrictions. Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0248, 7 pages.

Jizheng Xu et al., Non-CE8: On IBC reference buffer design. Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0472_v2, 6 pages.

Han Gao et al., Non-CE8: IBC Reference Memory for Arbitrary CTU Size. Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0175-v2, 7 pages.

JVET-M0407-CE8.1.2a CE8.1.2d spec text, Jan. 17, 2019, 1 page.

Xiaozhong Xu et al., CE8: CPR reference memory reuse without increasing memory requirement (CE8.1.2a and CE8.1.2d). Joint Video Experts Team (JVET) of ITU-T SG 16 WP 3 and ISO/IEC JTC 1/SC 29/WG 11, 13th Meeting: Marrakesh, MA, Jan. 9-18, 2019, JVET-M0407-v3, 10 pages.

Benjamin Bross et al., Versatile Video Coding (Draft 4). Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v6, 285 pages.

Benjamin Bross et al., Versatile Video Coding (Draft 5). Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v1, 341 pages.

Han Gao et al., Non-CE8: IBC Reference Area Rearrange, JVET-N0173-v2, Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.

Document: JVET-N0096-v2, Chen-Yen Lai et al., CE8-related: A fixed updating order for IBC reference memory, Joint Video Experts Team (JVET) of ITU-T SG 16 WP 3 and ISO/IEC JTC 1/SC 29/WG 11, 14th Meeting: Geneva, CH, Mar. 19-27, 2019, total 5 pages.

Yu Han et al., CE8-related: Default Processing for IBC Mode, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0316, 4 pages.

Jizheng Xu et al.,"Non-CEB: On IBC reference buffer design", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0472 v2, total 6pages.

Jianle Chen et al.,"Algorithm description for Versatile Video Coding and Test Model 4 (VTM 4)", Joint Video Experts Team (JVET) of ITU-T SG 16 WP 3 and ISO/IEC JTC 1/SC 29/WG 11,13th Meeting: Marrakech, MA, Jan. 9-18, 2019, JVET-M1002-v2, total 62 pages.

* cited by examiner

10

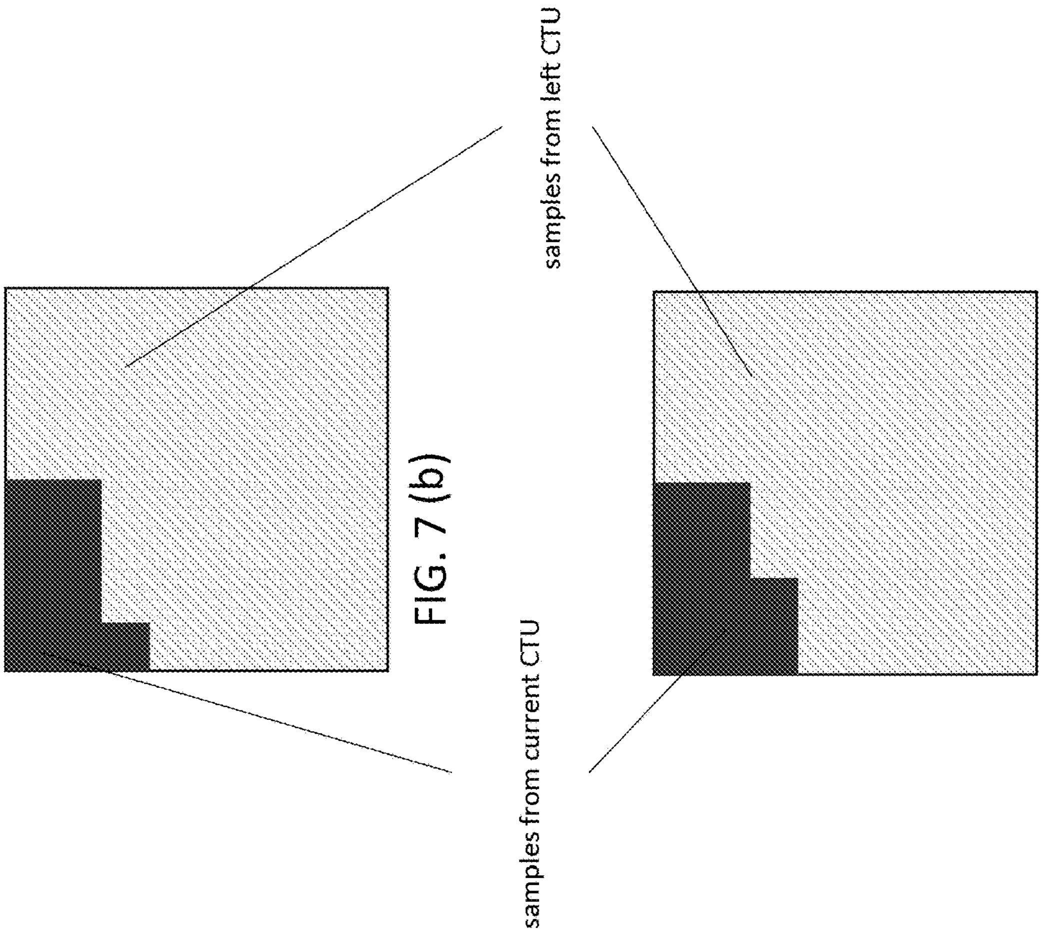
FIG. 7 (b)
FIG. 7 (c)
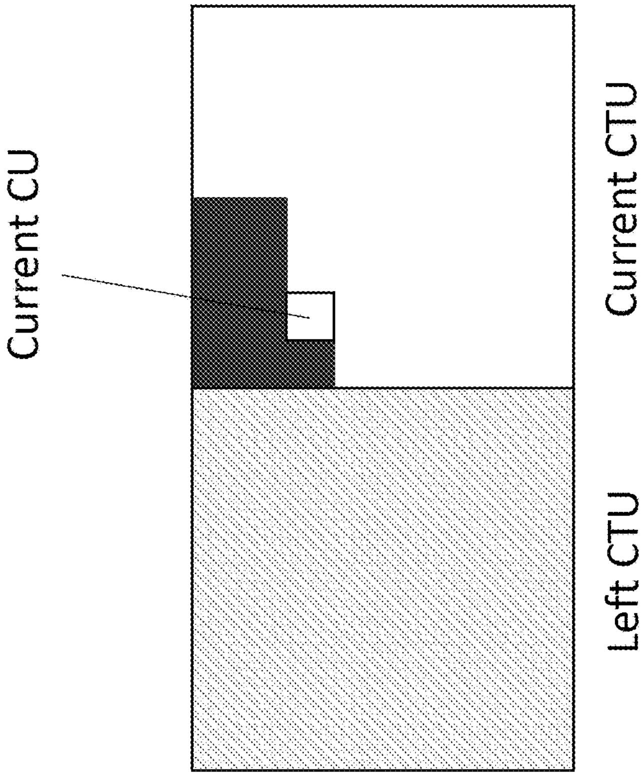
FIG. 7 (a)

ENCODER, A DECODER AND CORRESPONDING METHODS USING INTRA BLOCK COPY (IBC) DEDICATED BUFFER AND DEFAULT VALUE REFRESHING FOR LUMA AND CHROMA COMPONENT

CROSS-REFERENCE TO RELATED APPLICATIONS

This application is a continuation of U.S. patent application Ser. No. 17/141,147, filed on Jan. 4, 2021, which is a continuation of International Application No. PCT/CN2020/090053, filed on May 13, 2020, The International Application claims priority to U.S. provisional Patent Application No. 62/849,119, filed on May 16, 2019, and International Patent Application No. PCT/EP2019/065540, filed on Jun. 13, 2019. All of the afore-mentioned patent applications are hereby incorporated by reference in their entireties.

TECHNICAL FIELD

Embodiments of the present application generally relate to the field of picture processing and more particularly to an encoder, a decoder, and corresponding methods using IBC dedicated buffer.

BACKGROUND

Video coding (video encoding and decoding) is used in a wide range of digital video applications, for example, broadcast digital TV, video transmission over the internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY OF THE DISCLOSURE

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

A first embodiment of the present disclosure provides a method of coding, implemented by a decoding device, comprising: initializing a dedicated buffer for intra block copy (IBC) referencing, when a current coding tree unit (CTU) to be decoded is a first CTU of a CTU row, determining whether a current block in the current CTU is predicted using IBC mode, obtaining an IBC block vector for the current block when the current block is predicted using IBC mode, and obtaining predicted sample values for the current block, based on reference samples from the dedicated buffer and the IBC block vector for the current block.

The reference samples from the dedicated buffer may be initialized to a default value. The default value may be −1.

The method according to the present embodiment removes all block vector validation bitstream conformance constraints. This increases robustness of the coded bitstream. Besides, the dedicated IBC buffer is initialized. Undefined samples are therefore avoided.

Consequently, no bitstream conformance for IBC block vector validation is required. In addition, no samples from the last CTU row are used in IBC referencing. In this case, no additional line memory is needed for IBC prediction.

According to an aspect of the first embodiment, a decoder is provided comprising processing circuitry for carrying out any one of the methods according to the first embodiment. The decoder may further comprise a dedicated buffer for storing IBC reference samples.

According to a further aspect of the first embodiment, a computer program product is provided comprising instructions which, when the program is executed by a computer, cause the computer to carry out any one of the methods according to the first embodiment.

According to a further aspect of the first embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the first embodiment.

A second embodiment of the present disclosure provides a method of coding, implemented by an encoding device, comprising initializing a dedicated buffer for intra block copy (IBC) referencing, when a current coding tree unit (CTU) to be encoded is a first CTU of a CTU row, obtaining predicted sample values for a current block in the current CTU, based on reference samples from the dedicated buffer, and encoding an IBC block vector for the current block, based on the predicted sample values for the current block.

The reference samples from the dedicated buffer may be initialized to a default value. The default value may be −1.

The method according to the present embodiment removes all block vector validation bitstream conformance constraints. This increases robustness of the coded bitstream. Besides, the dedicated IBC buffer is initialized. Undefined samples are therefore avoided.

Consequently, no bitstream conformance for IBC block vector validation is required. In addition, no samples from the last CTU row are used in IBC referencing. In this case, no additional line memory is needed for IBC prediction.

According to an aspect of the second embodiment, an encoder is provided comprising processing circuitry for carrying out any one of the methods of the second embodiment. The encoder may further comprise a dedicated buffer for storing IBC reference samples.

According to a further aspect of the second embodiment, a computer program product is provided comprising instructions which, when the program is executed by a computer, cause the computer to carry out any one of the methods according to the second embodiment.

According to a further aspect of the second embodiment, an encoder is provided comprising one or more processors and a non-transitory computer-readable storage medium coupled to the one or more processors and storing instructions for execution by the one or more processors, wherein the instructions, when executed by the one or more processors, configure the encoder to carry out any one of the methods according to the second embodiment.

A third embodiment of the present disclosure provides a method of coding, implemented by a decoding device, comprising initializing a dedicated buffer for intra block copy (IBC) referencing for an area of a coding tree unit (CTU), when a current coding block to be decoded is a first coding block in the area of the CTU, determining whether the current block in the current CTU is predicted using IBC mode, obtaining an IBC block vector for the current block when the current block is predicted using IBC mode, and obtaining predicted sample values for the current block, based on reference samples from the dedicated buffer and the IBC block vector for the current block.

The reference samples from the dedicated buffer may be initialized to a default value. The default value may be −1.

The area of the CTU may be a fixed size, non-overlapped area. The area may be a virtual pipeline processing unit, VPDU. A size of the area may be 64×64.

No bitstream conformance for IBC block vector validation is required. No samples from the last CTU row are used in IBC referencing. In this case, no additional line memory is used for IBC prediction. In addition, the IBC referencing memory size is the same as in the current VVC design, i.e. no additional memory is required for implementing the embodiment. For the current VPDU referencing, there is no need to access the dedicated IBC buffer.

According to an aspect of the third embodiment, a decoder is provided comprising processing circuitry for carrying out any one of the methods according to the third embodiment. The decoder may further comprise a dedicated buffer for storing IBC reference samples.

According to a further aspect of the third embodiment, a computer program product is provided comprising instructions which, when the program is executed by a computer, cause the computer to carry out any one of the methods according to the third embodiment.

According to a further aspect of the third embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the third embodiment.

A fourth embodiment of the present disclosure provides a method of coding, implemented by a decoding device, comprising initializing a dedicated buffer for intra block copy (IBC) referencing, when a current coding tree unit (CTU) to be decoded is a first CTU of a picture, determining whether a current block in the current CTU is predicted using IBC mode, obtaining an IBC block vector for the current block when the current block is predicted using IBC mode, and obtaining predicted sample values for the current block, based on reference samples from the dedicated buffer and the IBC block vector for the current block.

The reference samples from the dedicated buffer may be initialized to a default value. The default value may be −1.

The method according to the present embodiment removes all block vector validation bitstream conformance constraints. This increases robustness of the coded bitstream. Besides, the dedicated IBC buffer is initialized. Undefined samples are therefore avoided.

According to an aspect of the fourth embodiment, a decoder is provided comprising processing circuitry for carrying out any one of the methods according to the fourth embodiment. The decoder may further comprise a dedicated buffer for storing IBC reference samples.

According to a further aspect of the fourth embodiment, a computer program product is provided comprising instructions which, when the program is executed by a computer, cause the computer to carry out any one of the methods according to the fourth embodiment.

According to a further aspect of the fourth embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the fourth embodiment.

A fifth embodiment of the present disclosure provides a method of coding, implemented by a decoding device, comprising initializing a dedicated buffer for intra block copy (IBC) referencing, when a current block is a first coding block in a current coding tree unit (CTU), wherein the CTU is a first CTU of a CTU row, determining whether a current block in the current CTU is predicted using IBC mode, obtaining an IBC block vector for the current block when the current block is predicted using IBC mode, and obtaining predicted sample values for the current block, based on reference samples from the dedicated buffer and the IBC block vector for the current block.

The reference samples from the dedicated buffer may be initialized to a default value. The default value may be −1.

Consequently, no bitstream conformance for IBC block vector validation is required. In addition, no samples from the last CTU row are used in IBC referencing. In this case, no additional line memory is needed for IBC prediction.

According to an aspect of the fifth embodiment, a decoder is provided comprising processing circuitry for carrying out any one of the methods according to the fifth embodiment. The decoder may further comprise a dedicated buffer for storing IBC reference samples.

According to a further aspect of the fifth embodiment, a computer program product is provided comprising instructions which, when the program is executed by a computer, cause the computer to carry out any one of the methods according to the fifth embodiment.

According to a further aspect of the fifth embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the fifth embodiment.

A sixth embodiment of the present disclosure provides a method of coding, implemented by a decoding device, comprising: providing a dedicated buffer for intra block copy (IBC) referencing; determining whether a current block to be decoded is predicted using IBC mode;

obtaining an IBC block vector for the current block when the current block is predicted using IBC mode; and obtaining predicted sample values for the current block, based on reference samples from the dedicated buffer and the IBC block vector for the current block; wherein the dedicated buffer is initialized to a default value, when the current block is a first coding block of a first coding tree unit (CTU) in a current frame.

The method according to the present embodiment removes all block vector validation bitstream conformance constraints. This increases robustness of the coded bitstream. Besides, the dedicated IBC buffer is initialized. Undefined samples are therefore avoided.

The method may further comprise initializing the dedicated buffer to the default value, when the current block is a first coding block of a CTU row in the current frame.

Consequently, no bitstream conformance for IBC block vector validation is required. In addition, no samples from the last CTU row are used in IBC referencing. In this case, no additional line memory is needed for IBC prediction.

The method may further comprise initializing the dedicated buffer for an area of a CTU to the default value, when the current block is a first coding block in the area of the CTU. The area of the CTU may be a fixed size, non-overlapped area. The area may in particular, be a virtual pipeline processing unit (VPDU).

No bitstream conformance for IBC block vector validation is required. No samples from the last CTU row are used in IBC referencing. In this case, no additional line memory is used for IBC prediction. In addition, the IBC referencing memory size is the same as in the current VVC design, i.e. no additional memory is required for implementing the embodiment. For the current VPDU referencing, there is no need to access the dedicated IBC buffer.

The default value may be −1.

The default value may be obtained based on an internal bit depth for a sequence of frames, wherein the current block is a block of the sequence.

When chroma components of the current block are predicted using IBC mode and co-located luma components of the current block are predicted not using IBC mode, the IBC block vector for the chroma components of the current block may be set to a default block vector.

The current block may comprise at least two sub-blocks, wherein, when chroma components of a sub-block are predicted using IBC mode and co-located luma components of the sub-block are predicted not using IBC mode, the IBC block vector for the chroma components of the sub-block may be set to a default block vector.

The default block vector may be (0, 0). The default vector may be the IBC block vector of a co-located central luma sample for the current block, when the co-located central luma sample for the current block is predicted by using IBC mode.

Consequently, additional bitstream conformance checks may be avoided for the chroma component in the separated tree case.

The dedicated buffer may be referenced based on $((x+BVx) \% W, (y+BVy) \% H)$, wherein for $x<0$, $x \% L \triangleq L-(-x \% L)$, where W and H represent the dedicated buffer size, x and y represent a predicted sample of the current block, and (BVx, BVy) represents the IBC block vector of the current block.

According to an aspect of the sixth embodiment, a decoder is provided comprising processing circuitry for carrying out any one of the methods according to the sixth embodiment. The decoder may further comprise a dedicated buffer for storing IBC reference samples.

According to a further aspect of the sixth embodiment, a computer program product is provided comprising instructions which, when the program is executed by a computer, cause the computer to carry out any one of the methods according to the sixth embodiment.

According to a further aspect of the sixth embodiment, a decoder is provided comprising one or more processors and a non-transitory computer-readable storage medium coupled to the one or more processors and storing instructions for execution by the one or more processors, wherein the instructions, when executed by the one or more processors, configure the decoder to carry out any one of the methods according to the sixth embodiment.

According to a further aspect of the sixth embodiment, a decoder is provided comprising a dedicated buffer for intra block copy (IBC) referencing; a determining module configured to determine whether a current block to be decoded is predicted using IBC mode; a first obtaining module configured to obtain an IBC block vector for the current block when the current block is predicted using IBC mode; a second obtaining module configured to obtain predicted sample values for the current block, based on reference samples from the dedicated buffer and the IBC block vector for the current block; and an initializing module configured to initialize the dedicated buffer to a default value, when the current block is a first coding block of a first coding tree unit (CTU) in a current frame.

A seventh embodiment of the present disclosure provides a method of coding, implemented by an encoding device, comprising providing a dedicated buffer for intra block copy (IBC) referencing; obtaining predicted sample values for a current block to be encoded, based on reference samples from the dedicated buffer; and obtaining an IBC block vector for the current block, based on the predicted sample values for the current block; wherein the dedicated buffer is initialized to a default value, when the current block is a first coding block of a first coding tree unit (CTU) in a current frame.

The method according to the present embodiment removes all block vector validation bitstream conformance constraints. This increases robustness of the coded bitstream. Besides, the dedicated IBC buffer is initialized. Undefined samples are therefore avoided.

The method may further comprise initializing the dedicated buffer to the default value, when the current block is a first coding block of a CTU row in the current frame.

Consequently, no bitstream conformance for IBC block vector validation is required. In addition, no samples from the last CTU row are used in IBC referencing. In this case, no additional line memory is needed for IBC prediction.

The method may further comprise initializing the dedicated buffer for an area of a CTU to the default value, when the current block is a first coding block in the area of the CTU. The area of the CTU may be a fixed size, non-overlapped area. The area may in particular, be a virtual pipeline processing unit (VPDU).

No bitstream conformance for IBC block vector validation is required. No samples from the last CTU row are used in IBC referencing. In this case, no additional line memory is used for IBC prediction. In addition, the IBC referencing memory size is the same as in the current VVC design, i.e. no additional memory is required for implementing the embodiment. For the current VPDU referencing, there is no need to access the dedicated IBC buffer.

The default value may be −1.

The default value may be obtained based on an internal bit depth for a sequence of frames, wherein the current block is a block of the sequence.

When chroma components of the current block are predicted using IBC mode and co-located luma components of the current block are predicted not using IBC mode, the IBC block vector for the chroma components of the current block may be set to a default block vector.

The current block may comprise at least two sub-blocks, wherein, when chroma components of a sub-block are predicted using IBC mode and co-located luma components of the sub-block are predicted not using IBC mode, the IBC block vector for the chroma components of the sub-block may be set to a default block vector.

The default block vector may be (0, 0). The default vector may be the IBC block vector of a co-located central luma sample for the current block, when the co-located central luma sample for the current block is predicted by using IBC mode.

Consequently, additional bitstream conformance checks may be avoided for the chroma component in the separated tree case.

The dedicated buffer may be referenced based on ((x+BVx) % W, (y+BVy) % H), wherein for x<0, x % L≙L−(−x % L), where W and H represent the dedicated buffer size, x and y represent a predicted sample of the current block, and (BVx, BVy) represents the IBC block vector of the current block.

According to an aspect of the seventh embodiment, an encoder is provided comprising processing circuitry for carrying out any one of the methods according to the seventh embodiment. The encoder may further comprise a dedicated buffer for storing IBC reference samples.

According to a further aspect of the seventh embodiment, a computer program product is provided comprising instructions which, when the program is executed by a computer, cause the computer to carry out any one of the methods according to the seventh embodiment.

According to a further aspect of the seventh embodiment, an encoder is provided comprising one or more processors and a non-transitory computer-readable storage medium coupled to the one or more processors and storing instructions for execution by the one or more processors, wherein the instructions, when executed by the one or more processors, configure the encoder to carry out any one of the methods according to the seventh embodiment.

According to a further aspect of the seventh embodiment, an encoder is provided comprising a dedicated buffer for intra block copy (IBC) referencing; a first obtaining module configured to obtain predicted sample values for a current block to be encoded, based on reference samples from the dedicated buffer; a second obtaining module configured to obtain an IBC block vector for the current block, based on the predicted sample values for the current block; and an initializing module configured to initialize the dedicated buffer to a default value, when the current block is a first coding block of a first coding tree unit (CTU) in a current frame.

An eighth embodiment of the present disclosure provides a method of coding implemented by a decoding device, comprising initializing a dedicated buffer based on a default value, when the current block is the first coding block of the first coding tree unit (CTU) in a current frame (or picture), the dedicated buffer being used for intra block copy (IBC) referencing, determining whether the current block is predicted using IBC mode or not, obtaining an IBC block vector for the current block when the current block is predicted using IBC mode, and obtaining predicted sample values for the current block, based on the dedicated buffer and the IBC block vector for the current block.

A ninth embodiment of the present disclosure provides a method of coding implemented by an encoding device, comprising initializing a dedicated buffer based on a default value, when the current block is the first coding block of the first coding tree unit (CTU) in a current frame (or picture), the dedicated buffer being used for intra block copy (IBC) referencing, obtaining predicted sample values for the current block, based on the dedicated buffer, and obtaining an IBC block vector for the current block, based on the predicted sample values for the current block.

In a tenth embodiment, a method of coding implemented by a decoding device is disclosed, the method comprising:

- initializing a dedicated buffer based on a default value, when the current block is the first coding block of the first coding tree unit (CTU) in a current frame (or picture), the dedicated buffer is used for intra block copy (IBC) referencing;
- determining whether the current block is predicted using IBC mode or not;
- obtaining an IBC block vector for the current block when the current block is predicted using IBC mode; and
- obtaining predicted sample values for the current block, based on the dedicated buffer and the IBC block vector for the current block.

In one implementation, the method further comprises:

- initializing the dedicated buffer based on the default value, when the current block is the first coding block of a CTU row in the current frame (or picture).

In one implementation, the method further comprises:

- initializing a dedicated buffer for an area of a CTU based on the default value, when the current block is the first coding block in the area of the CTU.

In one implementation, the area in a CTU is a fixed size non-overlapped area.

In one implementation, the default value is obtained based on an internal bit depth for a sequence, wherein the current block is a block of the sequence.

In one implementation, when chroma components of the current block are predicted using IBC mode and co-located luma components of the current block are predicted not using IBC mode, the IBC block vector for chroma components of the current block is a default block vector.

In one implementation, the current block comprises at least two sub-blocks, and when chroma components of a sub-block are predicted using IBC mode and co-located luma components of the sub-block are predicted not using IBC mode, the IBC block vector for chroma components of the sub-block is a default block vector.

In one implementation, the default block vector is (0, 0).

In one implementation, the default vector is the block vector of the co-located central luma sample for the current block, when the co-located central luma sample for the current block is predicted by using IBC mode.

In an eleventh embodiment, a method of coding implemented by an encoding device is disclosed, the method comprising:

- initializing a dedicated buffer based on a default value, when the current block is the first coding block of the first coding tree unit (CTU) in a current frame (or picture), the dedicated buffer is used for intra block copy (IBC) referencing;

obtaining predicted sample values for the current block, based on the dedicated buffer;

obtaining an IBC block vector for the current block, based on the predicted sample values for the current block.

In one implementation, the method further comprises:

initializing the dedicated buffer based on the default value, when the current block is the first coding block of a CTU row in the current frame (or picture).

In one implementation, the method further comprises:

initializing a dedicated buffer for an area of a CTU based on the default value, when the current block is the first coding block in the area of the CTU.

In one implementation, the area in a CTU is a fixed size non-overlapped area.

In one implementation, the default value is obtained based on an internal bit depth for a sequence, wherein the current block is a block of the sequence.

In one implementation, when chroma components of the current block are predicted using IBC mode and co-located luma components of the current block are predicted not using IBC mode, the IBC block vector for chroma components of the current block is a default block vector.

In one implementation, the current block comprises at least two sub-blocks, and when chroma components of a sub-block are predicted using IBC mode and co-located luma components of the sub-block are predicted not using IBC mode, the IBC block vector for chroma components of the sub-block is a default block vector.

In one implementation, the default block vector is (0, 0).

In one implementation, the default vector is the block vector of the co-located central luma sample for the current block, when the co-located central luma sample for the current block is predicted by using IBC mode.

In one embodiment, an encoder comprising processing circuitry for carrying out the method according to any one of the above embodiments or implementations is disclosed.

In one embodiment, a decoder comprising processing circuitry for carrying out the method according to any one of the above embodiments or implementations is disclosed.

In one embodiment, a computer program product comprising a program code for performing the method according to any one of the above embodiments or implementations is disclosed.

In one embodiment, a decoder is disclosed, the decoder comprising:

one or more processors; and a non-transitory computer-readable storage medium coupled to the processors and storing programming for execution by the processors, wherein the programming, when executed by the processors, configures the decoder to carry out the method according to any one of the above embodiments or implementations.

In one embodiment, an encoder is disclosed, the encoder comprising:

one or more processors; and a non-transitory computer-readable storage medium coupled to the processors and storing programming for execution by the processors, wherein the programming, when executed by the processors, configures the encoder to carry out the method according to any one of the above embodiments or implementations.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the disclosure are described in more detail with reference to the attached figures and drawings, in which:

FIG. 7 (*a*)-(*c*) show further examples about the relationship between reference samples and IBC buffer;

Figure 1A:
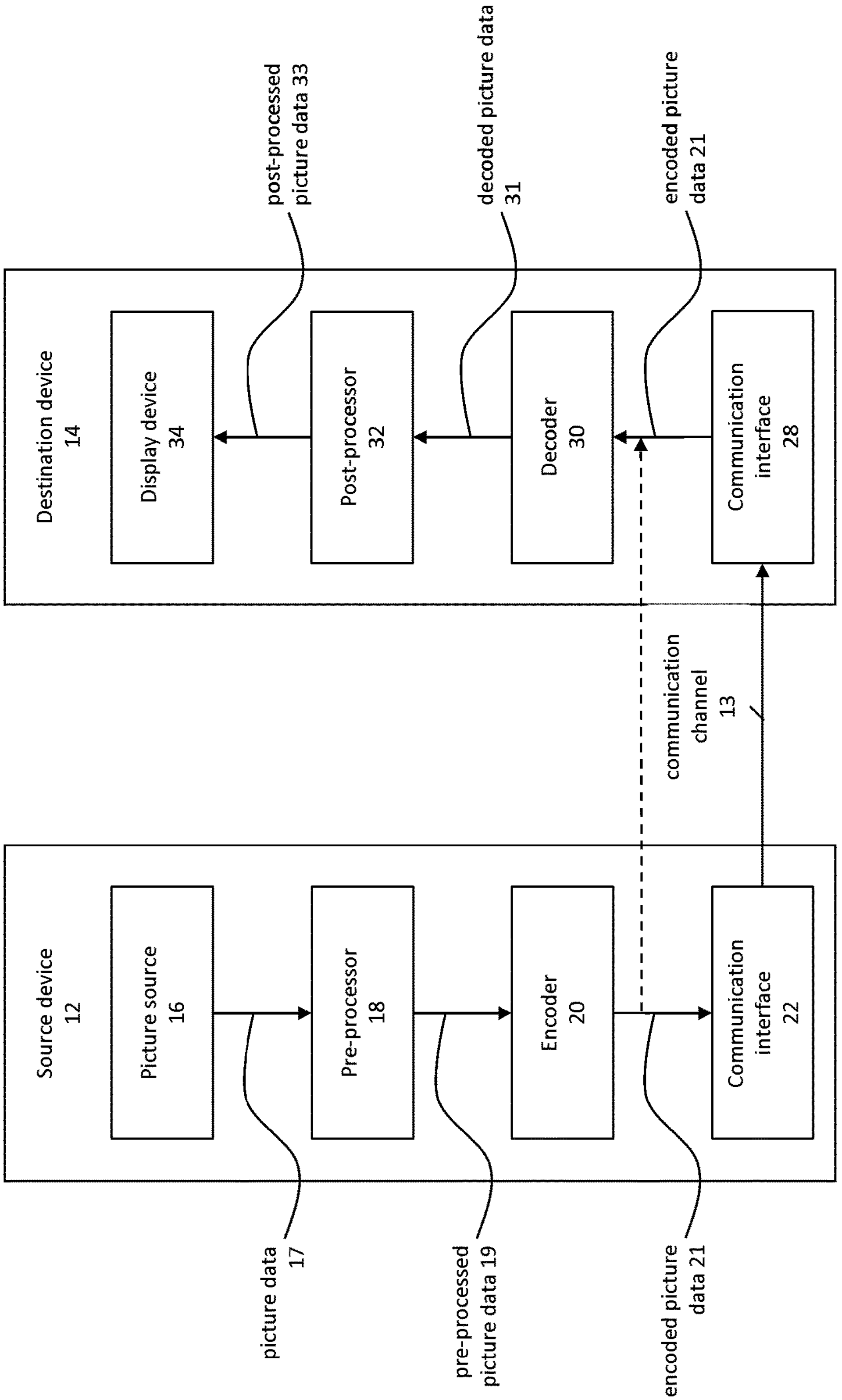
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the disclosure. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss occurs during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 may be configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 may be configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 may be configured to receive the encoded picture data 21 (or any further processed version thereof), e.g. directly from the source device 12 or from any other source, e.g. a storage device, such as an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or as bi-directional communication interfaces, and may be configured to send and receive messages, e.g. to set up a connection, to acknowledge and exchange any other information related to the communication link and/or data transmission, such as encoded picture data transmission.

The decoder 30 may be configured to receive the encoded picture data 21 and provide decoded picture data 31 or a decoded picture 31 (further details will be described below, e.g., based on FIG. 3 or FIG. 5). The post-processor 32 of destination device 14 may be configured to post-process the decoded picture data 31 (also called reconstructed picture data), e.g. the decoded picture 31, to obtain post-processed picture data 33, such as a post-processed picture 33. The post-processing performed by the post-processing unit 32 may comprise any one or more of color format conversion (e.g. from YCbCr to RGB), color correction, trimming, or re-sampling, or any other processing, e.g. for preparing the decoded picture data 31 for display, e.g. by display device 34.

The display device 34 of the destination device 14 may be configured to receive the post-processed picture data 33 for displaying the picture, e.g. to a user or viewer. The display device 34 may be or comprise any kind of display for representing the reconstructed picture, such as an integrated or external display or monitor. The display may be a liquid crystal displays (LCD), an organic light emitting diodes (OLED) display, a plasma display, a projector, a micro LED display, a liquid crystal on silicon (LCoS), a digital light processor (DLP) or any kind of other display.

Although FIG. 1A depicts the source device 12 and the destination device 14 as separate devices, embodiments of devices may also comprise both devices or both functionalities, i.e. the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
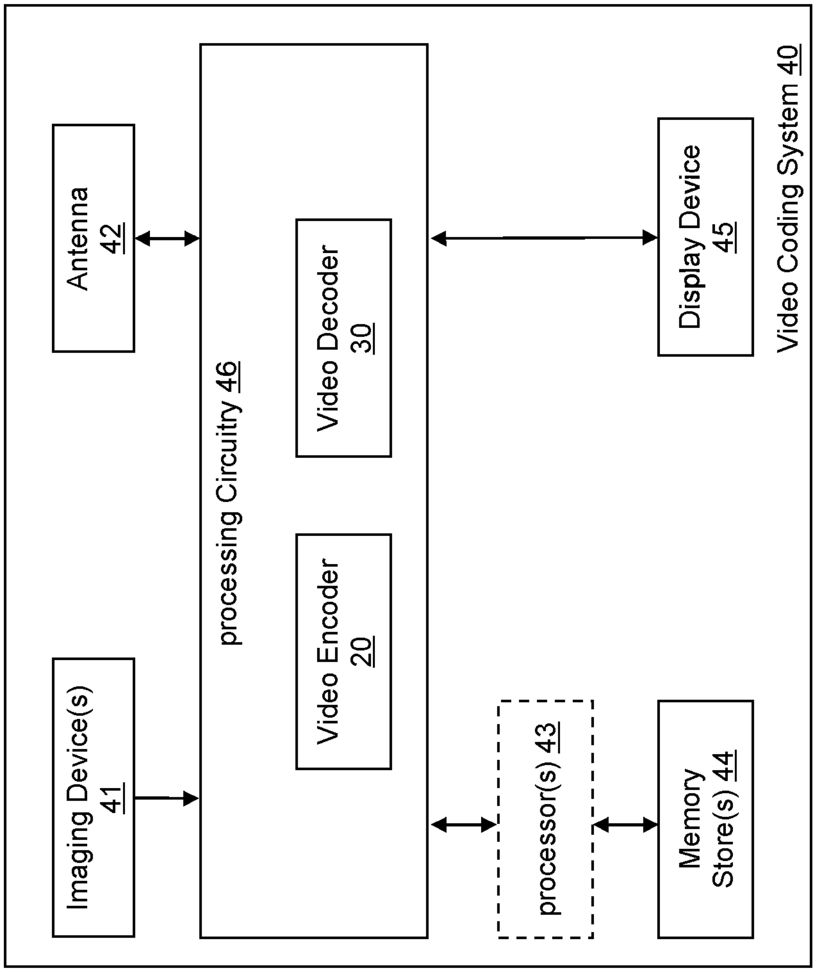
FIG. 1B is a block diagram showing another example of a video coding system configured to implement embodiments of the disclosure.

The encoder 20 (e.g. a video encoder 20) or the decoder 30 (e.g. a video decoder 30) or both, encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Video encoder 20 and video decoder 30 may be integrated as part of a combined encoder/decoder (CODEC) in a single device, for example, as shown in FIG. 1B.

The video coding system 40 shown in FIG. 1B comprises a processing circuitry implementing both a video encoder 20 and a video decoder 30. In addition, one or more imaging devices 41, such as a camera for capturing real-world pictures, an antenna 42, one or more memory stores 44, one or more processors 43 and/or a display device 45, such the display device 34 described above, may be provided as part of the video coding system 40.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver devices, broadcast transmitter devices, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding systems (e.g., video encoding or video decoding) that do not necessarily include any data communication between the encoding and decoding devices. In other examples, data is retrieved from a local memory, streamed over a network, or the like. A video encoding device may encode and store data in memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
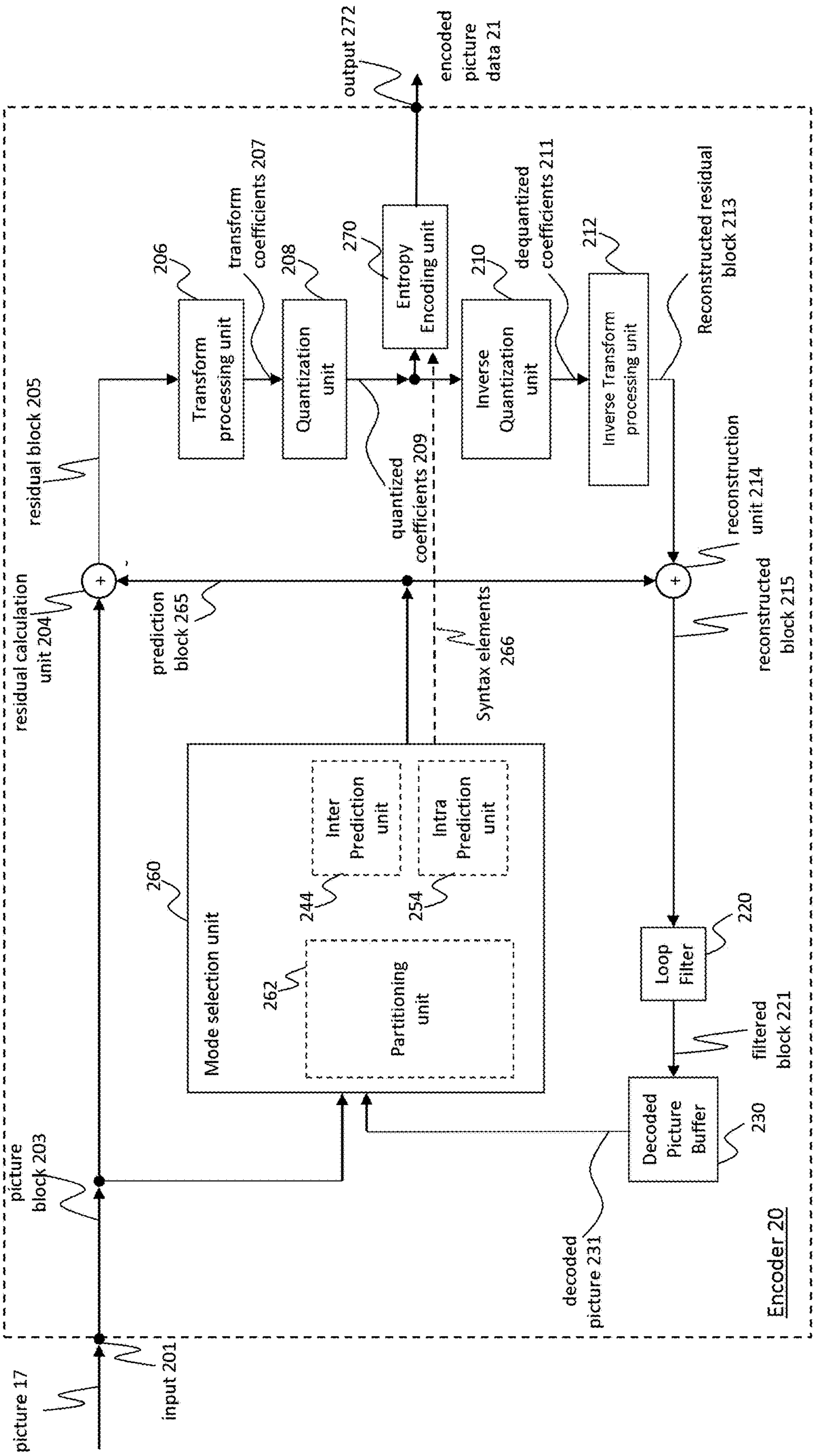
FIG. 2 is a block diagram showing an example of a video encoder configured to implement embodiments disclosed herein.

FIG. 2 shows a block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and an inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. The inter prediction unit 244 may include a motion estimation unit and a motion compensation unit (not shown). A video encoder 20 as shown in FIG. 2 may also be referred to as a hybrid video encoder or a video encoder according to a hybrid video codec.

Figure 3:
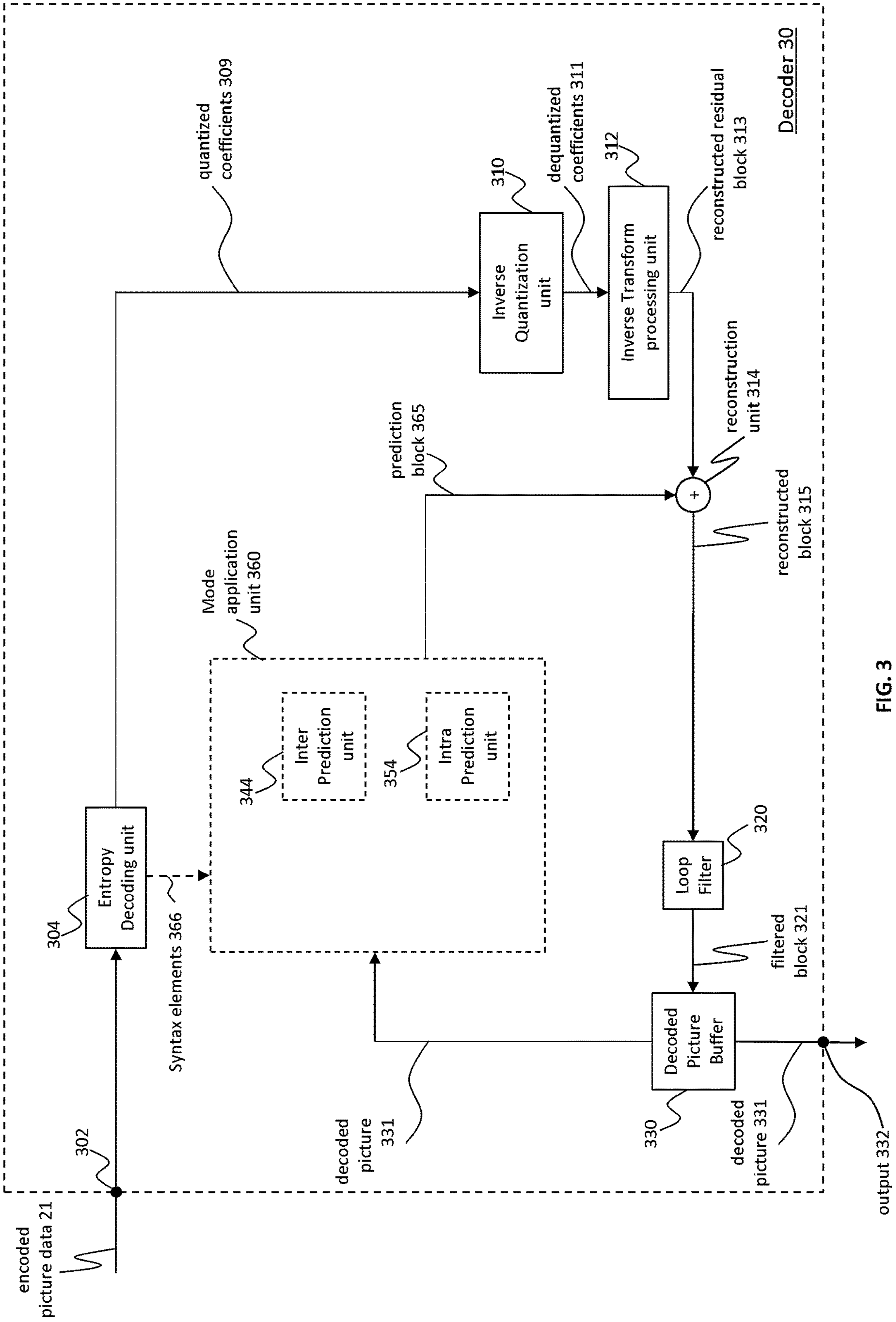
FIG. 3 is a block diagram showing an example structure of a video decoder configured to implement embodiments of the disclosure.

The residual calculation unit 204, the transform processing unit 206, the quantization unit 208, and the mode selection unit 260 may be referred to as forming a forward signal path of the encoder 20, whereas the inverse quantization unit 210, the inverse transform processing unit 212, the reconstruction unit 214, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. a picture of a sequence of pictures forming a video or video sequence. The received picture or picture data may also be a pre-processed picture 19 (or pre-processed picture data 19). For the sake of simplicity the following description refers to the picture 17. The picture 17 may also be referred to as a current picture or a picture to be coded (in particular, in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in the horizontal and vertical direction (or axis) of the array or picture defines the size and/or resolution of the picture. For representation of color, typically three color components are employed, i.e. the picture may be represented as or include three sample arrays. In RBG format or color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa. The process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (according to H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in the horizontal and vertical direction (or axis) of the block 203 defines the size of the block 203. Accordingly, a block may, for example, comprise an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, such as a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. The scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively, the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit transform coefficient during quantization, where n is greater than m. The degree of quantization may be modified by adjusting a quantization parameter (QP). For example for scalar quantization, different scalings may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may, for example, be an index of a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one exemplary implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively, the quantization unit 208) may be configured to output quantization parameters (QPs), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as a transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit may be configured to smooth pixel transitions, or otherwise improve the video quality. The loop filter unit 220 may comprise one or more loop filters such as a de-blocking filter, a sample-adaptive offset (SAO) filter or one or more other filters, such as a bilateral filter, an adaptive loop filter (ALF), a sharpening, a smoothing filter or a collaborative filter, or any combination thereof. Although the loop filter unit 220 is shown in FIG. 2 as being an in-loop filter, in other configurations, the loop filter unit 220 may be implemented as a post loop filter. The filtered block 221 may also be referred to as a filtered reconstructed block 221.

Embodiments of the video encoder 20 (respectively, the loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may also be configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, such as an original block 203 (current block 203 of the current picture 17), and reconstructed picture data, such as filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra- or inter-prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which again form blocks), e.g. iteratively using quad-tree-partitioning (QT), binary-tree partitioning (BT) or triple-tree-partitioning (TT) or any combination thereof, and to perform the prediction for each of the block partitions or sub-blocks, wherein the mode selection comprises the selection of the tree-structure of the partitioned block 203 and the prediction modes are applied to each of the block partitions or sub-blocks.

In the following, the partitioning (e.g. by partitioning unit 262) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as a binary-tree (BT), a tree using partitioning into three partitions is referred to as a ternary-tree (TT), and a tree using partitioning into four partitions is referred to as a quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), a prediction unit (PU), or a transform unit (TU) and/or to the corresponding blocks, e.g. a coding tree block (CTB), a coding block (CB), a transform block (TB) or a prediction block (PB).

For example, a coding tree unit (CTU) may be or comprise a CTB of luma samples and two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples and two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU.

In embodiments, e.g., according to the latest video coding standard currently in development, which is referred to as Versatile Video Coding (VVC), a combined quad-tree and binary-tree (QTBT) partitioning is for example used to partition a coding block. In the QTBT block structure, a CU can have either a square or rectangular shape. For example, a coding tree unit (CTU) is first partitioned by a quad-tree structure. The quad-tree leaf nodes are further partitioned by a binary-tree or ternary (or triple)-tree structure. The partitioning tree leaf nodes are called coding units (CUs), and that partition is used for prediction and transform processing without any further partitioning. This means that the CU, PU and TU have the same block size in the QTBT coding block structure. In parallel, multiple partitions, for example, triple-tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise intra-prediction modes and/or inter-prediction modes.

Intra-Prediction

The set of intra-prediction modes may comprise 35 different intra-prediction modes, such as non-directional modes like DC (or mean) mode and planar mode, or directional modes, e.g. as defined in HEVC, or may comprise 67 different intra-prediction modes, such as non-directional modes like DC (or mean) mode and planar mode, or directional modes, e.g. as defined for VVC.

The intra-prediction unit 254 is configured to use reconstructed samples of neighboring blocks of the same current picture to generate an (intra-)prediction block 265 according to an intra-prediction mode from the set of intra-prediction modes.

The intra-prediction unit 254 (or in general the mode selection unit 260) may be further configured to output intra-prediction parameters (or in general information indicative of the selected intra-prediction mode for the block) to the entropy encoding unit 270 in the form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous, at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, such as half/semi-pel and/or quarter-pel interpolation, or not.

In addition to the above prediction modes, skip mode and/or direct mode may be applied.

The inter-prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, such as reconstructed blocks of one or a plurality of previously decoded pictures 231, for motion estimation. By way of example, a video sequence may comprise the current picture and the previously decoded pictures 231, or in other words, the current picture and the previously decoded pictures 231 may be part of or form a sequence of pictures forming a video sequence.

The encoder 20 may be configured to select a reference block from a plurality of reference blocks of the same or different pictures of the plurality of previously decoded pictures and provide a reference picture (or reference picture index) and/or an offset (spatial offset) between the position (x, y coordinates) of the reference block and the position of the current block as inter-prediction parameters to the motion estimation unit. This offset is also called motion vector (MV).

The motion compensation unit may be configured to obtain, e.g. receive, an inter-prediction parameter and to perform inter-prediction based on or using the inter-prediction parameter to obtain an (inter-)prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter-prediction parameters, intra-prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of the present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile group or tile) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter-prediction unit 344 and an intra-prediction unit 354. Inter-prediction unit 344 may be or include a motion compensation unit. Video decoder 30 may, in some examples, perform a decoding pass generally reciprocal to the encoding pass described with respect to video encoder 20 of FIG. 2.

As explained with regard to the encoder 20, the inverse quantization unit 210, the inverse transform processing unit 212, the reconstruction unit 214, the loop filter 220, the decoded picture buffer (DPB) 230, the inter-prediction unit 244 and the intra-prediction unit 254 are also referred to as forming the "built-in decoder" of video encoder 20. Accordingly, the inverse quantization unit 310 may be identical in function to the inverse quantization unit 210, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters 366, such as any or all of inter-prediction parameters (e.g. reference picture index and motion vector), intra-prediction parameters (e.g. intra-prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter-prediction parameters, intra-prediction parameters and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general, information related to the inverse quantization) and quantized coefficients from the encoded picture data 21 (e.g. by parsing and/or decoding, e.g. by entropy decoding unit 304) and to apply, based on the quantization parameters, an inverse quantization to the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 313 in the sample domain. The reconstructed residual blocks 313 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in-loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output or respectively display.

The decoder 30 is configured to output the decoded picture 311, e.g. via output 312, for presentation or viewing to a user.

Prediction

The inter-prediction unit 344 may be identical to the inter-prediction unit 244 (in particular, to the motion compensation unit) and the intra-prediction unit 354 may be identical to the intra-prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra- or inter-prediction) per block based on reconstructed pictures, blocks or respective samples (filtered or unfiltered) to obtain the prediction block 365.

When the video slice or picture is coded as an intra-coded (I) slice, intra-prediction unit 354 of mode application unit 360 is configured to generate prediction block 365 for a picture block of the current video slice based on a signaled intra-prediction mode and data from previously decoded blocks of the current picture. When the video slice or picture is coded as an inter-coded (i.e., B, or P) slice, inter-prediction unit 344 (e.g. motion compensation unit) of mode application unit 360 is configured to produce prediction block 365 for a video block of the current video slice based on the motion vectors and other syntax elements received from entropy decoding unit 304. For inter-prediction, the prediction blocks may be produced from one of the reference pictures within one of the reference picture lists. Video decoder 30 may construct the reference picture lists, List 0 and List 1, using default construction techniques based on reference pictures stored in DPB 330. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video/picture block of the current video slice by parsing the motion vectors or related information and other syntax elements, and use the prediction information to produce the prediction blocks for the current video block being decoded. For example, the mode application unit 360 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-coded video block of the slice, inter-prediction status for each inter-coded video block of the slice, and other information to decode the video blocks in the current video slice. The same or similar approach may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise one or more blocks (e.g. CTUs) or one or more tiles, wherein each tile may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of the current block (including but not limited to control point motion vectors of affine mode, sub-block motion vectors in affine, planar, ATMVP modes, temporal motion vectors, and so on). For example, the value of a motion vector is constrained to a predefined range according to its representing bit number. If the representing bit number of the motion vector is bitDepth, then the range is −2^(bitDepth−1)~2^(bitDepth−1)−1, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the maximum difference between integer parts of the four 4×4 sub-block MVs is no more than N pixels, such as no more than 1 pixel. The following description provides two methods for constraining the motion vector according to the bitDepth.

Method 1: remove the overflow MSB (most significant bit) by the following operations:

$$ux = \left(mvx + 2^{bitDepth}\right) \% \ 2^{bitDepth} \tag{1}$$

$$mvx = \left(ux >= 2^{bitDepth-1}\right) \ ? \ \left(ux - 2^{bitDepth}\right) : ux \tag{2}$$

$$uy = \left(mvy + 2^{bitDepth}\right) \% \ 2^{bitDepth} \tag{3}$$

$$mvy = \left(uy >= 2^{bitDepth-1}\right) \ ? \ \left(uy - 2^{bitDepth}\right) : uy \tag{4}$$

where mvx is a horizontal component of a motion vector of an image block or a sub-block, mvy is a vertical component of a motion vector of an image block or a sub-block, and ux and uy indicate respective intermediate values.

For example, if the value of mvx is −32769, after applying formulae (1) and (2), the resulting value is 32767. In a computer system, decimal numbers are stored as two's complements. The two's complement of −32769 is 1,0111, 1111,1111,1111 (17 bits). Then, the MSB is discarded, so the resulting two's complement is 0111,1111,1111,1111 (decimal number is 32767), which is the same as the output by applying formulae (1) and (2).

$$ux = (mvpx + mvdx + 2^{bitDepth}) \% 2^{bitDepth} \quad (5)$$

$$mvx = (ux >= 2^{bitDepth-1}) \ ? \ (ux - 2^{bitDepth}): ux \quad (6)$$

$$uy = (mvpy + mvdy + 2^{bitDepth}) \% 2^{bitDepth} \quad (7)$$

$$mvy = (uy >= 2^{bitDepth-1}) \ ? \ (uy - 2^{bitDepth}): uy \quad (8)$$

The operations may be applied during the sum of the motion vector predictor mvp and the motion vector difference mvd, as shown in formulae (5) to (8).

Method 2: remove the overflow MSB by clipping the value:

$$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input values of the MV clipping process, and the definition of the function Clip3 is as follows:

$$Clip3(x, y, z) = \begin{cases} x; & z < x \\ y; & z > y \\ z; & \text{otherwise} \end{cases}$$

Figure 4:
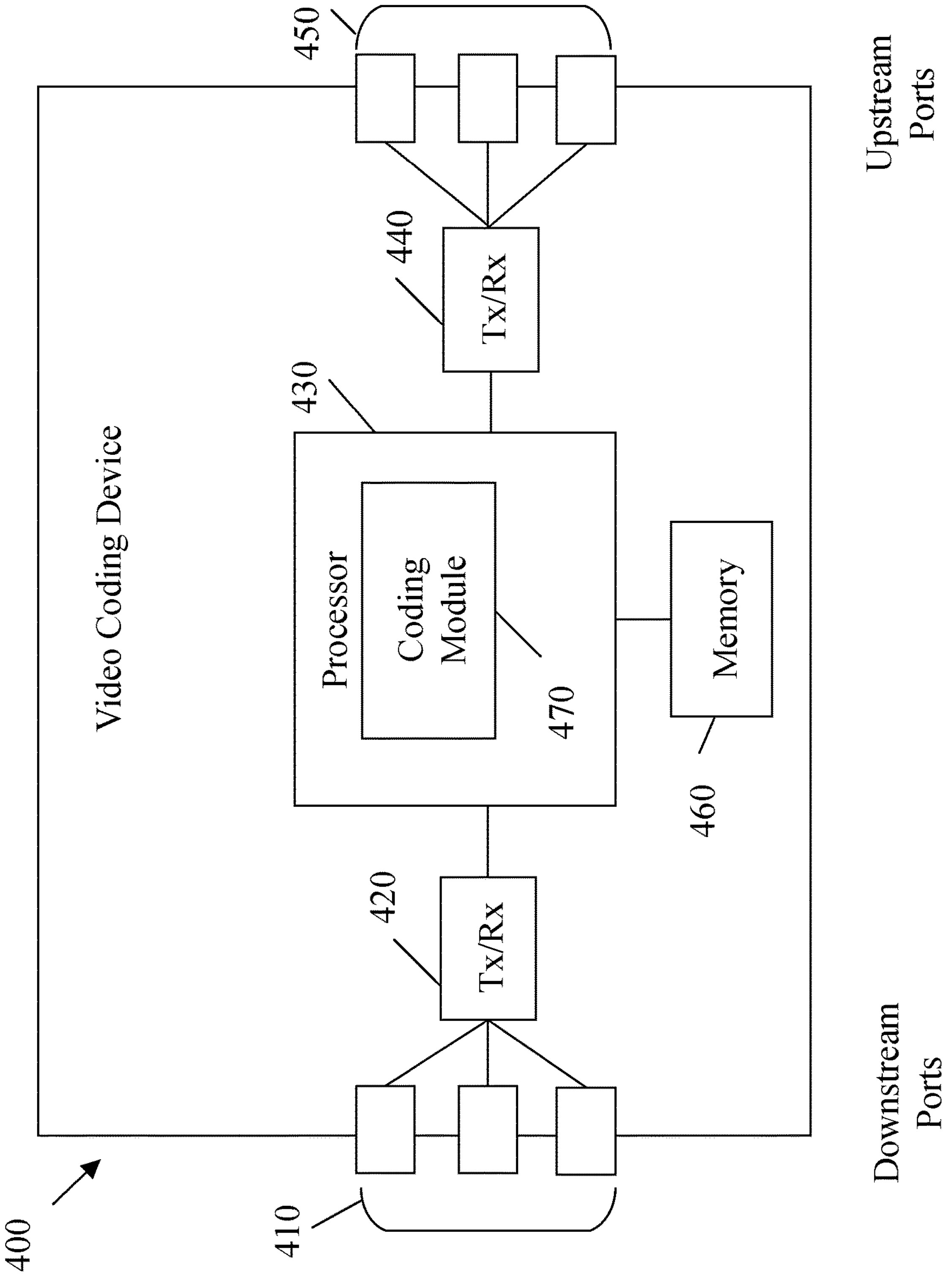
FIG. 4 is a block diagram illustrating an example of an encoding apparatus or a decoding apparatus.

FIG. 4 is a diagram of a video coding device 400 according to an embodiment of the present disclosure. The video coding device 400 is suitable for implementing the disclosed embodiments as described below. In an embodiment, the video coding device 400 may be a decoder such as video decoder 30 of FIG. 1A or an encoder such as video encoder 20 of FIG. 1A.

The video coding device 400 may comprise ingress ports 410 (or input ports 410) and one or more receiver units (Rx) 420 for receiving data; a processor, logic unit, or central processing unit (CPU) 430 to process the data; one or more transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 may be in communication with the ingress ports 410, the receiver units 420, the transmitter units 440, egress ports 450, and the memory 460. The processor 430 may comprise a coding module 470. The coding module 470 implements the disclosed embodiments described above and below. For instance, the coding module 470 may implement, process, prepare, or provide the various coding operations. The inclusion of the coding module 470 therefore provides a substantial improvement to the functionality of the video coding device 400 and effects a transformation of the video coding device 400 to a different state. Alternatively, the coding module 470 may be implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
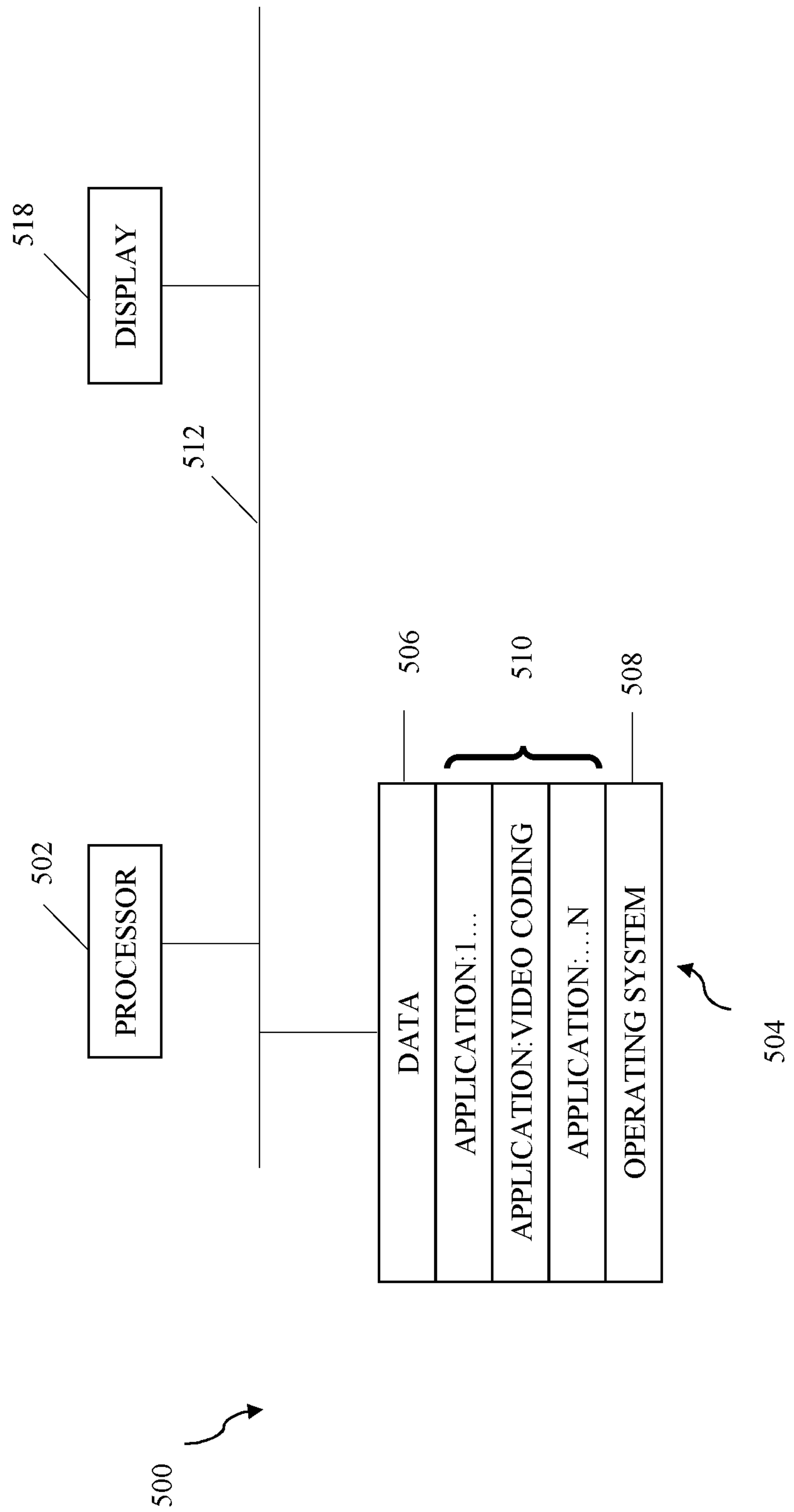
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1A according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described herein. For example, the application programs 510 can include applications 1 through N, which further include a video coding application that performs the methods described herein.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, a secondary storage (not shown) can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Intra block copy (IBC), also known as Current Picture Referencing (CPR) mode, is a tool adopted in HEVC extensions on Screen Content Coding (SCC). IBC significantly improves the coding efficiency of screen content materials. Since IBC mode is implemented as a block level coding mode, block matching (BM) is performed at the encoder to find the optimal block vector (or also called motion vector) for each CU. Here, a motion vector is used to indicate the displacement from the current block to a reference block, which is already reconstructed in the current picture. A luma motion vector of an IBC-coded CU is in integer precision. A chroma motion vector is clipped to integer precision as well. When combined with adaptive motion vector resolution (AMVR), the IBC mode can switch between 1-pel and 4-pel motion vector precisions. An IBC-coded CU may be treated as a third prediction mode other than intra prediction mode or inter prediction mode.

To reduce memory consumption and decoder complexity, the IBC in VVC Test Model 4 (VTM4) allows only the reconstructed portion of the predefined area including the current CTU to be used. This restriction allows the IBC mode to be implemented using local on-chip memory for hardware implementations.

At the encoder side, hash-based motion estimation is performed for IBC. The encoder performs rate distortion (RD) checks for blocks with either width or height no larger than 16 luma samples. For non-merge mode, the block vector search is performed using hash-based search first. If hash-based search does not return a valid candidate, a local search based on block matching will be performed.

At CU level, IBC mode is signaled with a flag, and the flag can be signaled as IBC Advanced Motion Vector Prediction (AMVP) mode or IBC skip/merge mode as follows:

IBC skip/merge mode: A merge candidate index which is used to indicate the block vector in the list from neighboring candidate IBC coded blocks, wherein the block vector is used to predict the current block. The merge candidate list comprises spatial candidates, History-based Motion Vector Prediction (HMVP) candidates, and pairwise candidates.

IBC AMVP mode: A block vector difference is coded in the same way as a motion vector difference. The block vector prediction method uses two candidates as predictors, one from the left neighbor block and one from the above neighbor block (if IBC mode is used to code the neighbor block). When a neighbor block is not available, a default block vector will be used as a predictor. A flag is signaled to indicate the block vector predictor index.

In VVC Draft 4.0, the search range of the IBC block vector is optimized by adopting JVET-M0407 which can be found under the link http://phenix.it-sudparis.eu/jvet/index-.php.

In JVET-M0407, the IBC block size is not allowed to be larger than 64×64 luma samples.

The method described below utilizes the reference memory buffer more efficiently such that the effective search range for IBC mode can be extended beyond the current CTU.

This means that as soon as any of the 64×64 blocks in the reference memory buffer begins to update with the reconstructed samples from the current CTU, the previous stored reference samples (from the left CTU) in the whole 64×64 block become unavailable for IBC reference purpose.

As each of the 64×64 blocks in the reference memory buffer is considered as a whole, when part of the 64×64 block has been updated with reconstructed samples from the current CTU, the reference samples from the left CTU in this 64×64 block cannot be used anymore.

Depending on the location of the current coding block relative to the current CTU, the following applies:

- If a current block is predicted using IBC mode and the current block falls into the top-left 64×64 block of the current CTU, then in addition to the already reconstructed samples in the current CTU, the current block can also refer to the reference samples in the bottom-right 64×64 block of the left CTU. In addition, the current block can refer to the reference samples in the bottom-left 64×64 block of the left CTU, and refer to the reference samples in the top-right 64×64 block of the left CTU (as shown in FIG. 6*a*).
- If a current block is predicted using IBC mode and the current block falls into the top-right 64×64 block of the current CTU, then in addition to the already reconstructed samples in the current CTU, if the luma samples in location (0, 64) relative to the current CTU have not yet been reconstructed, the current block can refer to the reference samples in the bottom-left 64×64 block, and refer to the reference samples in the bottom-right 64×64 block of the left CTU (as shown in FIG. 6*b*). If the luma samples in location (0, 64) relative to the current CTU have already been reconstructed, the current block can refer to reference samples in the bottom-right 64×64 block of the left CTU, but not the bottom-left 64×64 block of the left CTU.
- If a current block is predicted using IBC mode and the current block falls into the bottom-left 64×64 block of the current CTU, then in addition to the already reconstructed samples in the current CTU, if luma samples in location (64, 0) relative to the current CTU have not yet been reconstructed, the current block can refer to the reference samples in the top-right 64×64 block, and refer to the reference samples in the bottom-right 64×64 block of the left CTU, using IBC mode. If the luma samples in location (64, 0) relative to the current CTU have already been reconstructed, the current block can refer to the reference samples in the bottom-right 64×64 block of the left CTU (as shown in FIG. 6*c*).
- If a current block is predicted using IBC mode and the current block falls into the bottom-right 64×64 block of the current CTU, the current block can only refer to the already reconstructed samples in the current CTU (as shown in FIG. 6*d*).

A bitstream is a series of one or more coded video sequences. In order for a bitstream to conform to the VVC specification, requirements and restrictions in the VVC specification must be fulfilled. Syntax restrictions must be met. Data that does not conform to the VVC specification can be simply rejected by decoders; the standard does not specify what a decoder should do if such data is encountered. Non-conforming data may be the result of problems in a communication system, such as the loss of some of the data packets that contain bitstream data. A decoder may or may not attempt to continue decoding when non-conforming data is encountered. Nevertheless, the output of a VVC encoder shall always fully conform to the VVC specification.

For example, in VVC specification Draft 5.0 (JVET-N1001), a (0, 0) block vector for IBC predicted blocks is invalid as defined in the VVC specification requirements. A VVC decoder needs to conform that a bitstream does not include a (0, 0) block vector of an IBC predicted block.

In VVC Draft 5.0, the IBC reference memory buffer is combined with the decoder buffer. In order to reduce the hardware pipeline memory size for IBC reference samples, the above-mentioned variant size reference memory buffer is designed (JVET-M0407). In the variant size buffer design, lots for bitstream conformation is necessary. A VVC decoder checks whether the received bitstream is a valid VVC decodable bitstream. This check is generally called bitstream conformance check. To reduce the number of bitstream conformation, in JVET-N0472, a dedicated IBC reference memory buffer is designed instead of mixing IBC reference memory buffer and decoder buffer.

For a 128×128 CTU, the dedicated IBC buffer is defined as 128×128. When a CU (x, y) with size W×H has been decoded, the reconstructed samples in the CU are written to the W×H block area, starting from position (x %128, y %128), before loop-filtering. Here the modulo operator % always returns a positive number, i.e. for x<0, x % L ≜ L−(−x % L), e.g. −3%128=125. This process writes the reconstructed samples into the dedicated IBC buffer, which is used for further referencing.

When a block is predicted by using IBC mode, the predicted samples are obtained from the reference samples stored in the IBC dedicated memory. Assume that a sample (x, y) (or also called pixel (x, y)) is coded in IBC mode with block vector BV=(BVx, BVy), the pixel's prediction sample in the IBC reference buffer is located at ((x+BVx) %128, (y+BVy) %128).

When the buffer is considered as an area with a width equal to W and a height equal to H, after decoding a CTU or CU starting from (x, y), the reconstructed pixels will be stored before loop-filtering in the buffer starting from (x % W, y % H). Thus, after decoding a CTU, the corresponding IBC reference buffer will be updated accordingly. Such a setting may also happen when the CTU size is not 128×128. For example, for a 64×64 CTU, with the current buffer size, the IBC reference buffer can be considered as a 256×64 buffer.

FIG. 7*a* shows a current CTU, a current CU, and the left CTU. FIG. 7*b* shows the dedicated IBC buffer before the current block of the current CU is decoded. And FIG. 7*c* shows the dedicated IBC buffer after the current block is decoded.

Compared with the variable size IBC buffer used in VVC daft 5.0, the JVET-N0472 designed dedicated IBC buffer reduced the number of bitstream conformance constraints. However, the design still has drawbacks. For example, bitstream conformance is still needed for the block vector validation check. Furthermore, the dedicated IBC reference buffer increases the hardware pipeline memory size.

According to the present disclosure, the following embodiments are provided to solve the above-mentioned problems.

Embodiment 1

According to IBC reference samples design which is disclosed in VVC draft 5, the following bitstream conformance is required for IBC block vector validation checks.

For luma blocks or single tree case:

The reference samples must be available.

The reference samples must be from the same CTU row.

The reference samples must be from the current CTU or the left CTU of the current CTU.

Figure 6:
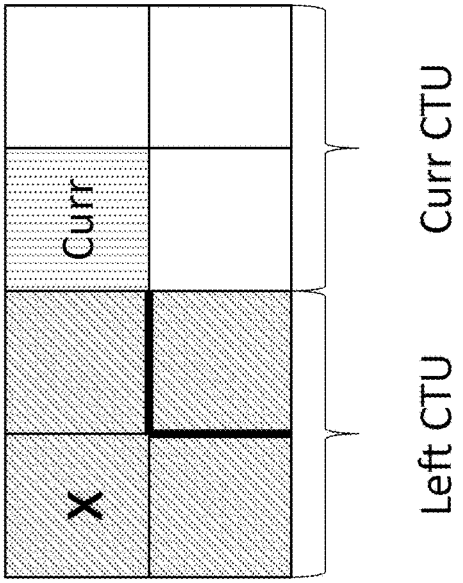
FIG. 6 (*a*)-(*d*) show examples about the relationship between reference samples and location of a current coding block.
Figure 6:
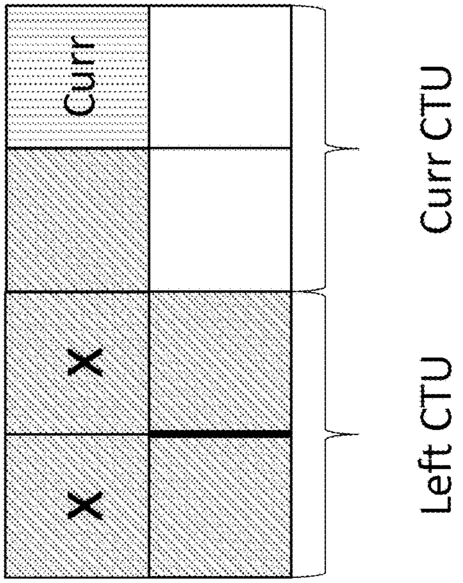
Figure 6:
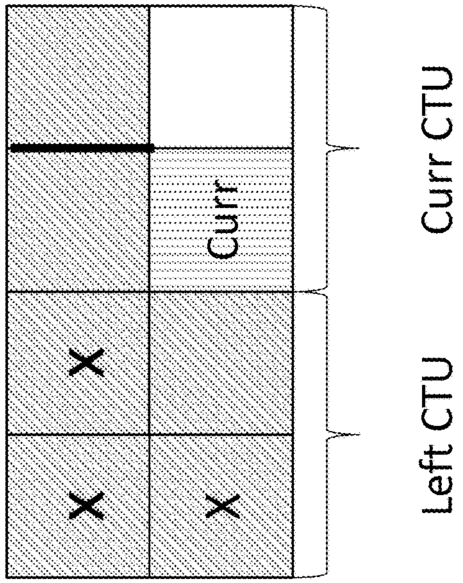
Figure 6:
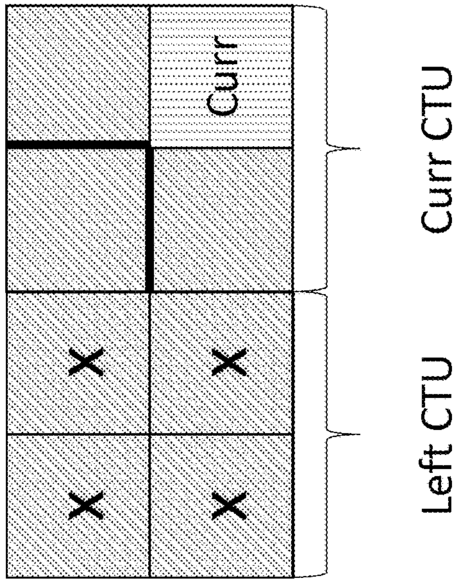

The reference samples must be in the defined IBC reference area as shown in FIG. 6.

These conformance constraints are described in chapter 8.6.2.1 of JVET-N1001, which can be found under the link http://phenix.it-sudparis.eu/jvet/index.php, as:

It is a requirement of bitstream conformance that the luma motion vector mvL shall obey the following constraints:

When the derivation process for block availability as specified in clause 6.4.X [Ed. (BB): Neighbouring blocks availability checking process tbd] is invoked with the current luma location (xCurr, yCurr) set equal to (xCb, yCb) and the neighbouring luma location (xCb+(mvL[0]>>4), yCb+(mvL[1]>>4)) as inputs, the output shall be equal to TRUE.

When the derivation process for block availability as specified in clause 6.4.X [Ed. (BB): Neighbouring blocks availability checking process tbd] is invoked with the current luma location (xCurr, yCurr) set equal to (xCb, yCb) and the neighbouring luma location (xCb+(mvL[0]>>4)+cbWidth−1, yCb+(mvL[1]>>4)+cbHeight−1) as inputs, the output shall be equal to TRUE.

One or both the following conditions shall be true:

The value of (mvL[0]>>4)+cbWidth is less than or equal to 0.

The value of (mvL[1]>>4)+cbHeight is less than or equal to 0.

The following conditions shall be true:

(*y*Cb+(mv*L*[1]>>4))>>Ctb Log 2Size*Y*=*y*Cb>>Ctb Log 2Size*Y*

(*y*Cb+(mv*L*[1]>>4)+cbHeight−1)>>Ctb Log 2Size*Y*=*y*Cb>>Ctb Log 2Size*Y*

(*x*Cb+(mv*L*[0]>>4))>>Ctb Log 2Size*Y*>=(*x*Cb>>Ctb Log 2Size*Y*)−1

(*x*Cb+(mv*L*[0]>>4)+cbWidth−1)>>Ctb Log 2Size*Y* (*x*Cb>>Ctb Log 2Size*Y*)

When (xCb+(mvL[0]>>4))>>Ctb Log 2SizeY is equal to (xCb>>Ctb Log 2SizeY)−1, the derivation process for block availability as specified in clause 6.4.X [Ed. (BB): Neighbouring blocks availability checking process tbd] is invoked with the current luma location (xCurr, yCurr) set equal to (xCb, yCb) and the neighbouring luma location (((xCb+(mvL[0]>>4)+CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) as inputs, and the output shall be equal to FALSE.

Here, (xCb, YCb) is a luma location specifying the top-left sample of the current coding block, wherein the luma location is relative to the top-left luma sample of the current picture, mvL is the luma motion vector (or block vector) in 1/16 fractional-sample accuracy, cbWidth is a variable specifying the width of the current coding block in luma samples, and cbHeight is a variable specifying the height of the current coding block in luma samples. CtbSizeY is the CTU size and Ctb Log 2SizeY is the CTU size in log 2 scale.

For separate/dual tree case and chroma blocks:

The reference samples must be available.

These conformance constraints are described in chapter 8.6.1 of NET-N1001 as follows:

It is a requirement of bitstream conformance that the chroma motion vector mvC[xSbIdx][ySbIdx] shall obey the following constraints:

When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.

When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.

One or both of the following conditions shall be true:

(mvC[xSbIdx][ySbIdx][0]>>5)+xSbIdx*2+2 is less than or equal to 0.

(mvC[xSbIdx][ySbIdx][1]>>5)+ySbIdx*2+2 is less than or equal to 0.

Where the numbers of luma coding subblocks in the horizontal direction numSbX and in the vertical direction numSbY are derived as follows:

$$numSbX=(cbWidth>>2)$$

$$numSbY=(cbHeight>>2)$$

Here, xSbIdx=0 . . . numSbX−1, ySbIdx=0 . . . numSbY−1 and mvL is the luma motion vector (or block vector) in 1/16 fractional-sample accuracy.

According to JVET-N0472, the dedicated IBC buffer is referenced based on ((x+BVx) % W, (y+BVy) % H) (for x<0, x % L ≜ L−(−x % L)), where W and H represent the dedicated IBC buffer size. In one example, for a 128×128 CTU, both W and H are equal to 128. Based on the dedicated IBC buffer referencing rule (((x+BVx) % W, (y+BVy) % H) (for x<0, x % L ≜ L−(−x % L))), the reference samples will not lie beyond the dedicated IBC reference memory area. Therefore, the reference samples must be from the current CTU or the left CTU of the current CTU, and the reference samples must be in the defined IBC reference area as shown in FIG. 6.

Therefore, the following bitstream conformance constraint is removed in N0472:

The reference samples must lie in the defined IBC reference area as shown in FIG. 6.

However, the reference samples must be available for luma or chroma and the reference samples from the same CTU row must still be kept, since in some corner case, the dedicated IBC buffer is empty. For example, in the first CTU of the picture, the dedicated IBC buffer is partially empty, with no samples from the left CTU.

According to embodiment 1, all bitstream conformance constraints for IBC block vector validation checks are removed for both luma and chroma components in the single tree case and the separated tree case. The predicted IBC block is referenced to samples from the dedicated IBC buffer and is referenced based on ((x+BVx) % W, (y+BVy) % H) (for x<0, x % L ≜ L−(−x % L)) where x, and y are the coordinates of the top-left sample of the current block, and BVx and BVy are block vectors for the current IBC block.

Figure 11:
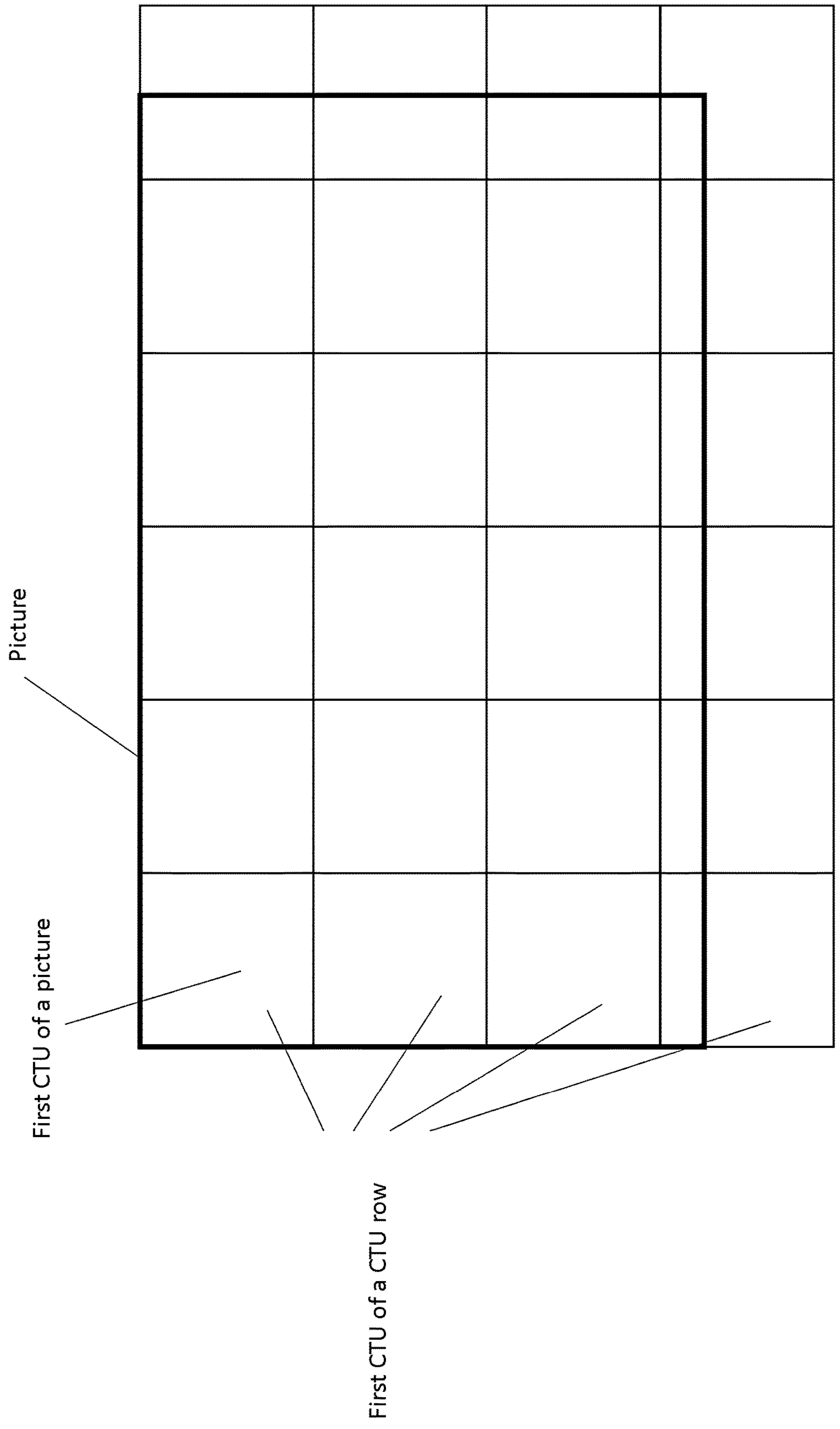
FIG. 11 shows an example of dividing a picture into CTUs.

When the block is the first CU of the first CTU of the picture as shown in FIG. 11, the dedicated IBC buffer is initialized with a default value. For example, a value of 1<<(InternalBitDepth−1) may be used as the default value. For 10 bits internal bit depth, the default value may be 512, for 8 bits internal bit depth, the default value may be 128.

Figure 8:
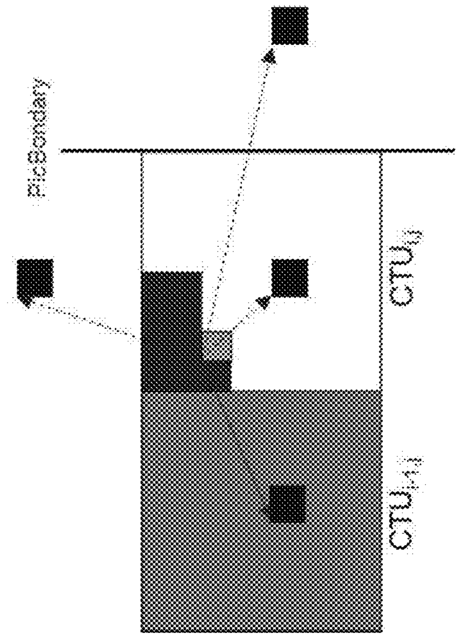
FIG. 8 (*a*)-(*c*) show further examples about the relationship between reference samples and IBC buffer.
Figure 8:
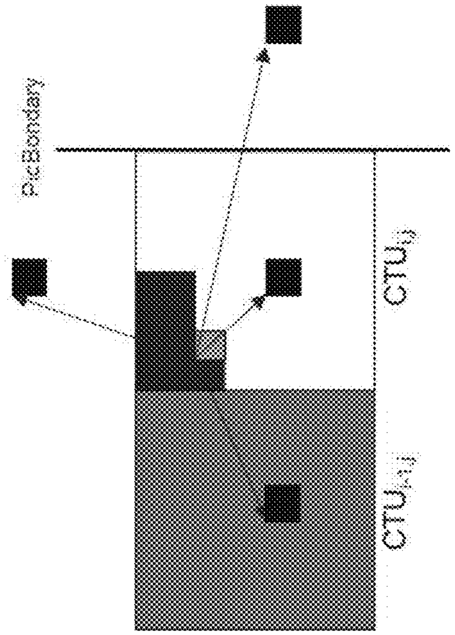

An example is shown in FIG. 8*a* that is based on the method in JVET-N0472. The solid arrow is a valid block vector, which can be encoded by the encoder into the bitstream, and parsed by the decoder from the bitstream. The dashed arrows are invalid block vectors, that may be encoded into the bitstream by the encoder but the VVC decoder cannot parse them from the bitstream, due to the bitstream conformance requirement.

Figure 8C:
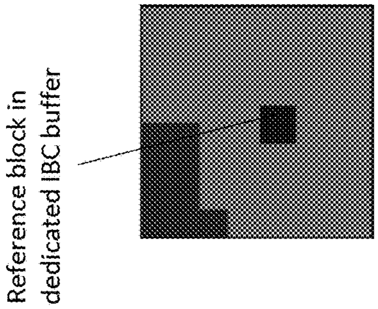

An example is shown in FIG. 8*b* that is based on the method in embodiment 1. As all IBC block vector validation checks bitstream conformance constraints are removed, all solid arrows are valid block vectors which can be encoded by the encoder into the bitstream and parsed by the decoder from the bitstream. Based on the form ((x+BVx) % W, (y+BVy) % H) (for x<0, x % L ≜ L−(−x % L)), all block vectors in FIG. 8*b* are referencing the reference block in the dedicated IBC buffer as shown in FIG. 8*c*.

One benefit of embodiment 1 is that it removes all block vector validation bitstream conformance constraints. This embodiment increases the robustness of the coded bitstream. Besides, the embodiment initializes the dedicated IBC buffer. Undefined samples are avoided.

Embodiment 2

Independent of or combined with embodiment 1, in embodiment 2, the dedicated IBC buffer is refreshed for each CTU row.

In addition to initializing the dedicated IBC buffer if a CTU is the first CTU of a picture, the first CTU of a CTU row is also initialized with the default value.

In an example, when the current block is the first CU in a CTU row as shown in FIG. 11, the dedicated IBC buffer is initialized with a default value. The default value may be defined as 1<<(InternalBitDepth−1). For 10 bits internal bit depth, the default value may be 512, for 8 bits internal bit depth, the default value may be 128.

Figure 9:
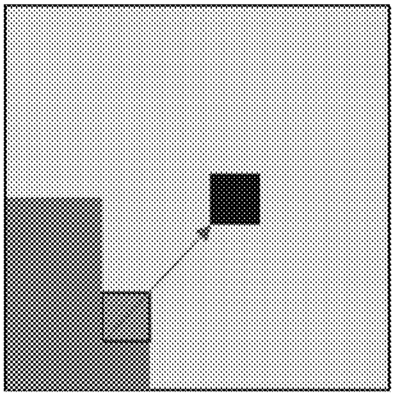
FIG. 9 (*a*)-(*b*) show further examples about the relationship between block vectors and IBC buffer.
Figure 9:
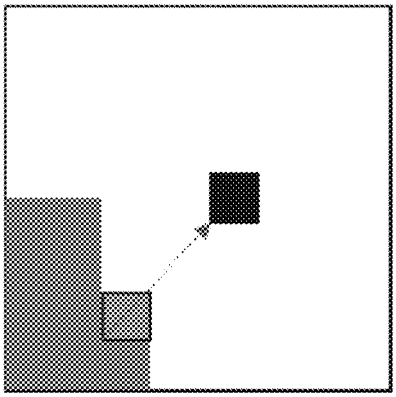

FIG. 9 shows examples for the first CTU of a CTU row in the luma component of the separated tree case or the single tree case. FIG. 9*a* illustrates the method in JVET-N0472. The dashed block vector is invalid. Because of the bitstream conformance requirement that the reference samples must be from the current CTU or the left CTU of the current CTU, the referencing area in the dedicated IBC buffer is empty. FIG. 9*b* shows the method according to embodiment 2, where the solid block vector is valid. The reference block area is initialized with default values.

In embodiment 2, no bitstream conformance for IBC block vector validation is required. In addition, no samples from the last CTU row are used in IBC referencing. In this case, no additional line memory is used for IBC prediction.

Embodiment 3

Independent of or combined with embodiments 1 and/or 2, in embodiment 3, the dedicated IBC buffer is refreshed for each virtual pipeline processing unit (VPDU). For example, for a 128×128 CTU, a VPDU is a 64×64 non-overlapped area. A 128×128 CTU is thus constructed from 4 VPDUs. In the hardware implementation, the VPDUs are processed sequentially.

In addition to initializing the dedicated IBC buffer if a CTU is the first CTU of a picture or the first CTU of a CTU row, in each VPDU, the dedicated IBC buffer needs to be refreshed by a default value.

In an example, when the current block is the first CU of a VPDU, the dedicated IBC buffer is initialized with a default value. The default value may be defined as 1<<(InternalBitDepth−1). For 10 bits internal bit depth, the default value may be 512, for 8 bits internal bit depth, the default value may be 128.

Figure 10:
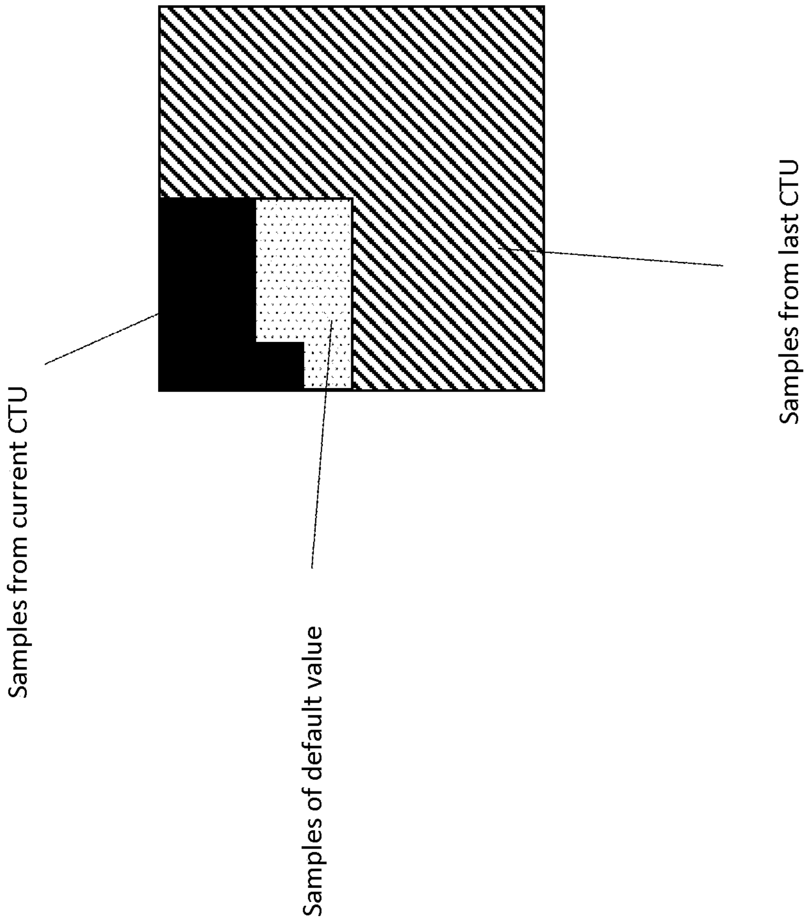
FIG. 10 shows an example of an IBC buffer for a CTU.

As shown in FIG. 10, the dedicated IBC buffer for a CTU can be constructed from samples for the current reconstructed CTU, samples from the last CTU, and samples of default values.

In embodiment 3, no bitstream conformance for IBC block vector validation is required. No samples from the last CTU row are used in IBC referencing. In this case, no additional line memory is used for IBC prediction. In addition, the IBC referencing memory size is the same as in the current VVC design, i.e. no additional memory is required for implementing the embodiment. For the current VPDU referencing, there is no need to access the dedicated IBC buffer.

In addition, in the VVC Draft JVET-N1001, the largest allowed size of a CU predicted with IBC mode is 128×64 or 64×128. In this case, the CU size is larger than a VPDU.

In order to keep the IBC referencing memory size the same as in the respective VVC design for a 128×64 or 64×128 size CU, one of the following rules may be applied on top of the current embodiment:

1.) A 64×128 or 128×64 size CU predicted by using IBC mode is not allowed. In an example, if one dimension of the current CU size is larger than 64, the value of an IBC mode indicator may implicitly be equal to 0 or another value which represents IBC mode may be disabled for the current CU, such that no indicator needs to be parsed from the bitstream.
2.) Based on the partitioning logic in VVC JVET-N1001, a 64×128 or 128×64 size CU must contain 2 VPDUs. In this case, both VPDUs are refreshed by default values. In one example, the default value may be defined as 1<<(InternalBitDepth−1). For each prediction, the VPDU area of the current PU may be refreshed with a default value. In an example, the top-left sample of the current CU may be the same as the top-left sample of the current CTU, and the current CU width may be 64 and height may be 128. In this case, the left half 64×128 area in the 128×128 dedicated IBC buffer may be refreshed with the value of 1<<(InternalBitDepth−1).
3.) Based on the partitioning logic in VVC JVET-N1001, a 64×128 or 128×64 size CU must contain 2 VPDUs. If a 64×128 or 128×64 size CU is predicted by using IBC mode, the two contained VPDU areas of the 64×128 or 128×64 size current CU may be considered as two separated prediction units (PUs) with the same block vector, and the prediction may be performed separately. For each prediction, the VPDU area of the current PU may be refreshed with a default value. In an example, if a CU is predicted by using IBC mode, the top-left sample of the current CU may be the same as the top-left sample of the current CTU, and the current CU width may be 64 and the height may be 128. In this case, the top-left 64×64 area of the 128×128 dedicated IBC buffer may be refreshed during predicting the first (top) PU of the current 64×128 CU. The bottom-left 64×64 area of the 128×128 dedicated IBC buffer may be refreshed during predicting the second (bottom) PU of the current 64×128 CU.

Embodiment 4

In the current VVC draft (JVET-N1001) IBC reference buffer design, or in the JVET-N0472 IBC reference buffer design, in the separated tree case, the chroma component can be predicted by IBC prediction mode. However, the IBC prediction mode for a chroma block requires bitstream conformance as follows:

A current chroma block in the separated tree case is divided into 2×2 sub-blocks, wherein each sub-block has a co-located luma component sub-block. When the chroma block is predicted by using IBC mode, the block vectors of each 2×2 chroma sub-block are inherited from the co-located luma component sub-block, when the co-located luma sub-block is predicted by IBC mode. When any co-located luma sub-block is not predicted by IBC mode, or the inherited BV is invalid based on the bitstream conformance in VVC Draft 5.0 or JVET-N0472 for chroma block, the current chroma block cannot be predicted by IBC mode.

Independent of or combined with embodiment 1, 2 or 3, in embodiment 4, the IBC prediction mode for chroma block bitstream conformance checks are not needed. In one example, a chroma block in the separated tree case is divided into 2×2 sub-blocks, wherein each sub-block has a co-located luma component sub-block. When the current block is predicted by using IBC mode, the block vectors of each 2×2 chroma sub-block are inherited from the co-located luma component sub-block, when the co-located luma sub-block is predicted by IBC mode. When the co-located luma sub-block is not predicted by using IBC mode, a default block vector may be set for the corresponding 2×2 chroma sub-block. The default vector in one example may be (0,0). In another example, the default vector may be the block vector of a central sample of an IBC predicted luma co-located block of the current chroma block.

Based on embodiment 4, additional bitstream conformance checks may be avoided for the chroma component in the separated tree case.

Figure 12:
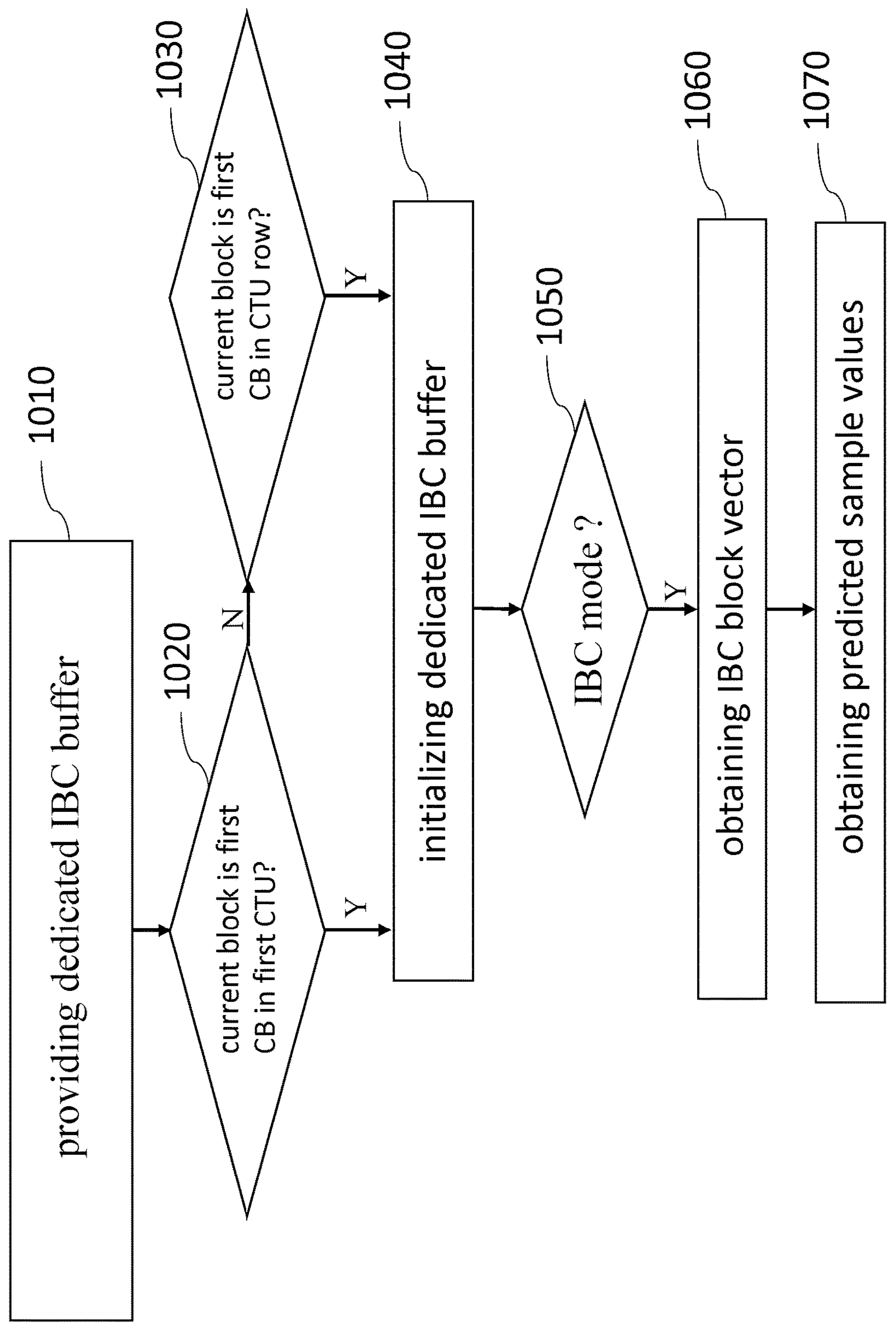
FIG. 12 shows a flowchart for a method of video decoding according to an embodiment of the disclosure.

FIG. 12 shows a flowchart for a method of video decoding according to an embodiment of the disclosure. In step 1010, a dedicated buffer for intra block copy (IBC) referencing is provided. In step 1020, it is determined whether a current coding block (CB) is a first coding block of a first coding tree unit (CTU) in a current frame. If this is the case, the dedicated buffer is initialized to a default value in step 1040. If not, it is determined in step 1030 whether the current coding block is a first coding block of a CTU row in the current frame. In this case, the dedicated buffer is initialized to a default value in step 1040.

Subsequently, it is determined in step 1050 whether the current block to be decoded is predicted using the IBC mode. When the current block is predicted using the IBC mode, an IBC block vector is obtained for the current block in step 1060. Finally, predicted sample values are obtained for the current block in step 1070, based on reference samples from the dedicated buffer and the IBC block vector for the current block.

Figure 13:
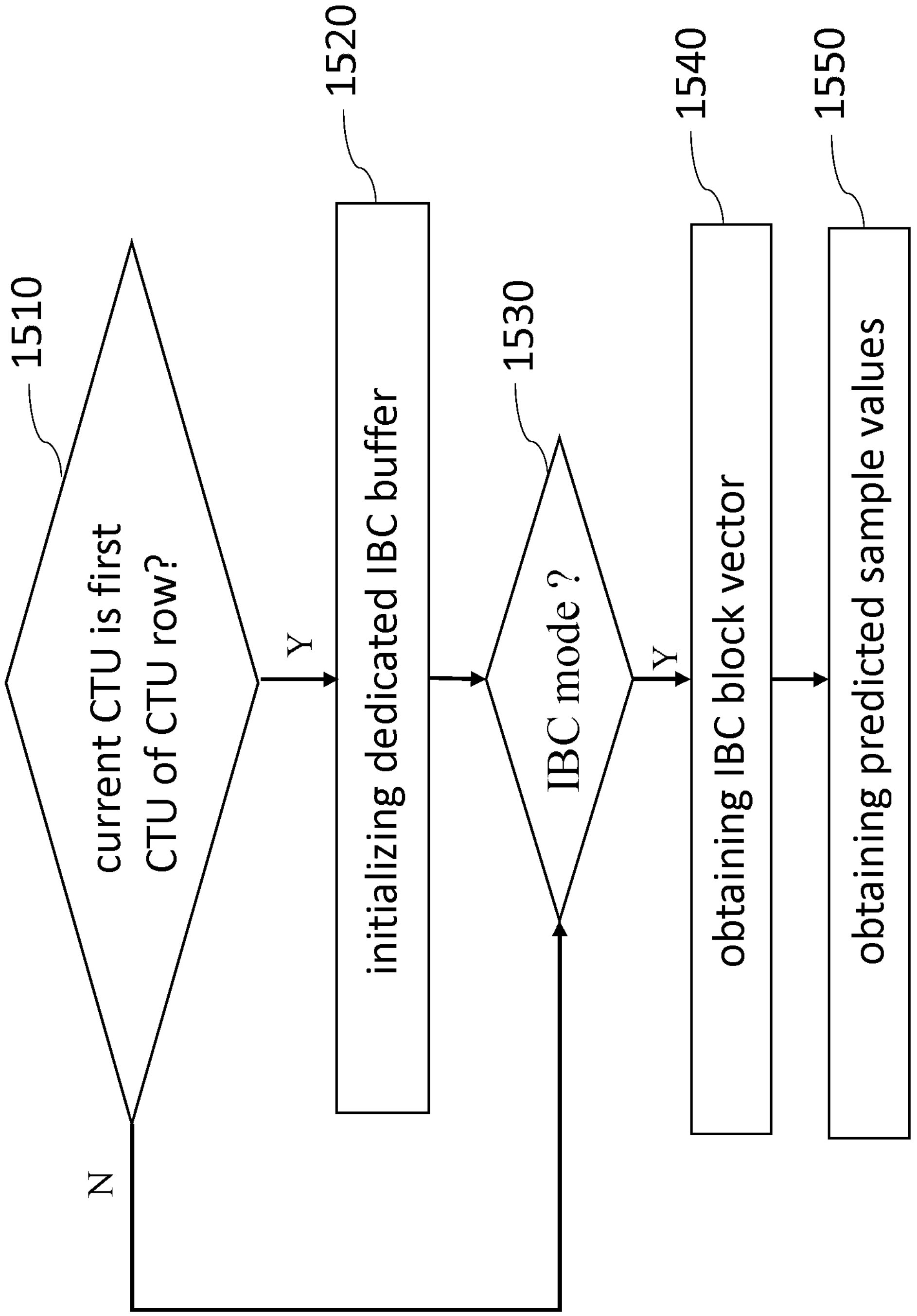
FIG. 13 shows a flowchart for a method of video decoding according to a further embodiment of the disclosure.

FIG. 13 shows a flowchart for a method of video decoding according to a further embodiment of the disclosure. A dedicated buffer for intra block copy (IBC) referencing is provided. In step 1510, it is determined whether a current coding tree unit (CTU) is the first CTU of a CTU row. If this is the case, the dedicated buffer is initialized to a default value in step 1520.

Subsequently, it is determined in step 1530 whether the current block to be decoded is predicted using the IBC mode. When the current block is predicted using IBC mode, an IBC block vector is obtained for the current block in step 1540. Finally, predicted sample values are obtained for the current block in step 1550, based on reference samples from the dedicated buffer and the IBC block vector for the current block.

Figure 14:
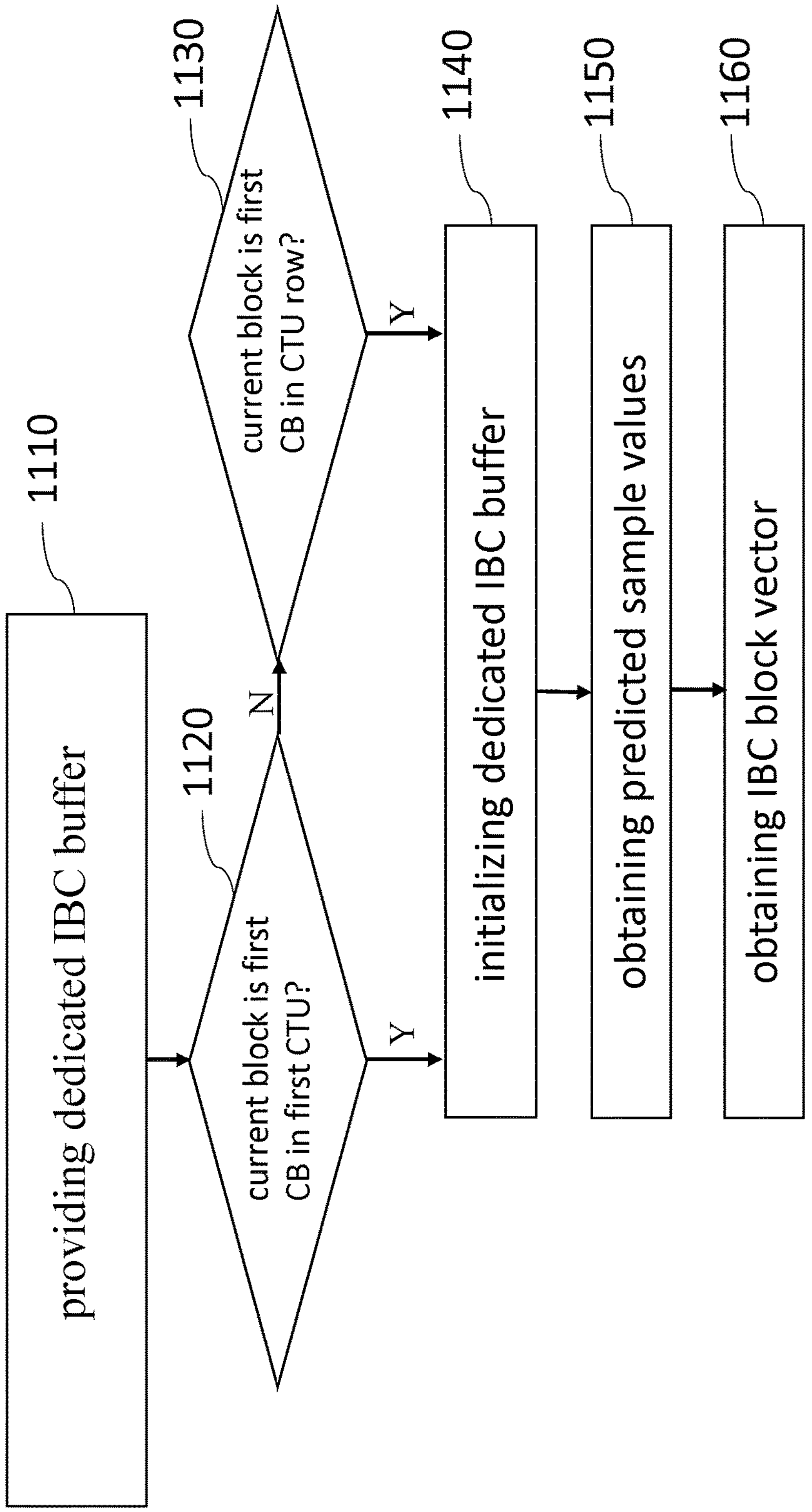
FIG. 14 shows a flowchart for a method of video encoding according to an embodiment of the disclosure.

FIG. 14 shows a flowchart for a method of video encoding according to an embodiment of the disclosure. In step 1110, a dedicated buffer for intra block copy (IBC) referencing is provided. In step 1120, it is determined whether a current coding block (CB) is the first coding block of the first coding tree unit (CTU) in a current frame. If this is the case, the dedicated buffer is initialized to a default value in step 1140. If not, it is determined in step 1130 whether the current coding block is the first coding block of a CTU row in the current frame. If so, the dedicated buffer is initialized to a default value in step 1040.

Subsequently, predicted sample values are obtained for the current block to be encoded in step 1150, based on reference samples from the dedicated buffer. Finally, an IBC block vector is obtained for the current block in step 1160, based on the predicted sample values for the current block.

Figure 15:
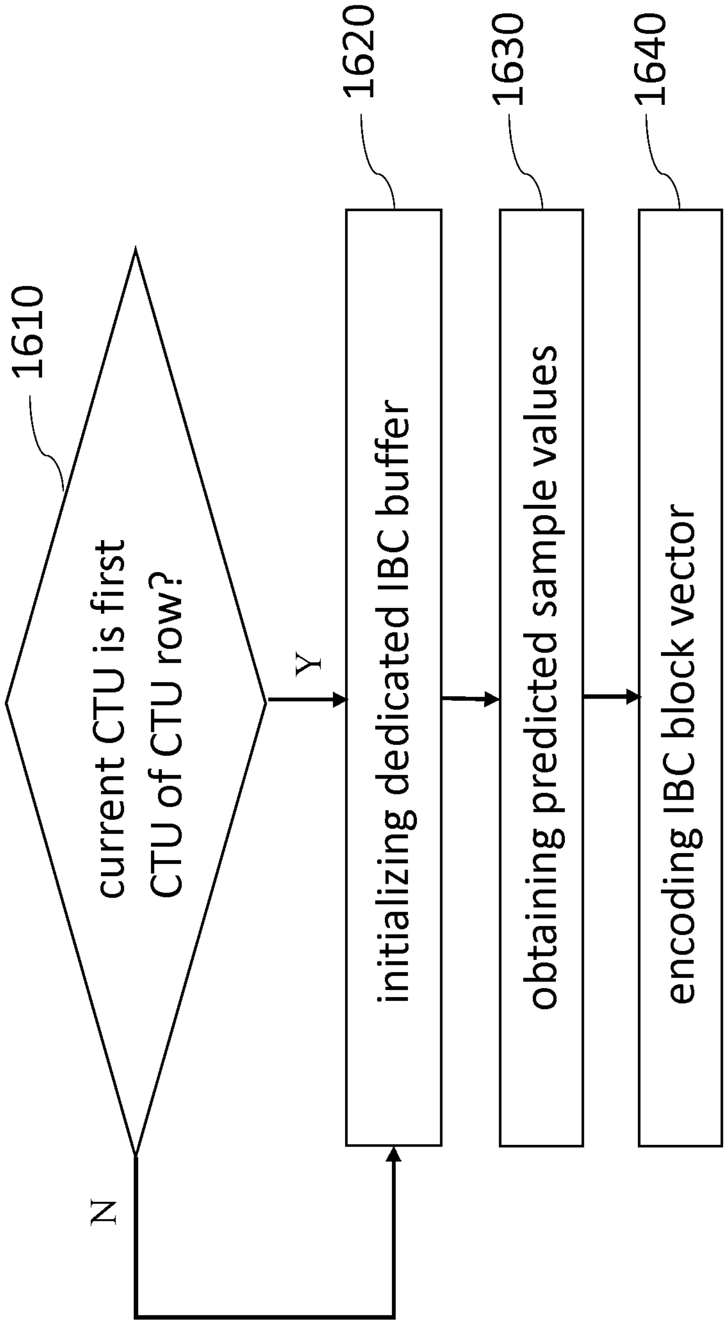
FIG. 15 shows a flowchart for a method of video encoding according to a further embodiment of the disclosure.

FIG. 15 shows a flowchart for a method of video encoding according to a further embodiment of the disclosure. A dedicated buffer for intra block copy (IBC) referencing is provided. In step 1610, it is determined whether a current coding tree unit (CTU) is the first CTU of a CTU row. If this is the case, the dedicated buffer is initialized to a default value in step 1620.

Subsequently, predicted sample values are obtained for the current block to be encoded in step 1630, based on reference samples from the dedicated buffer. Finally, an IBC block vector is obtained and encoded for the current block in step 1640, based on the predicted sample values for the current block.

Figure 16:
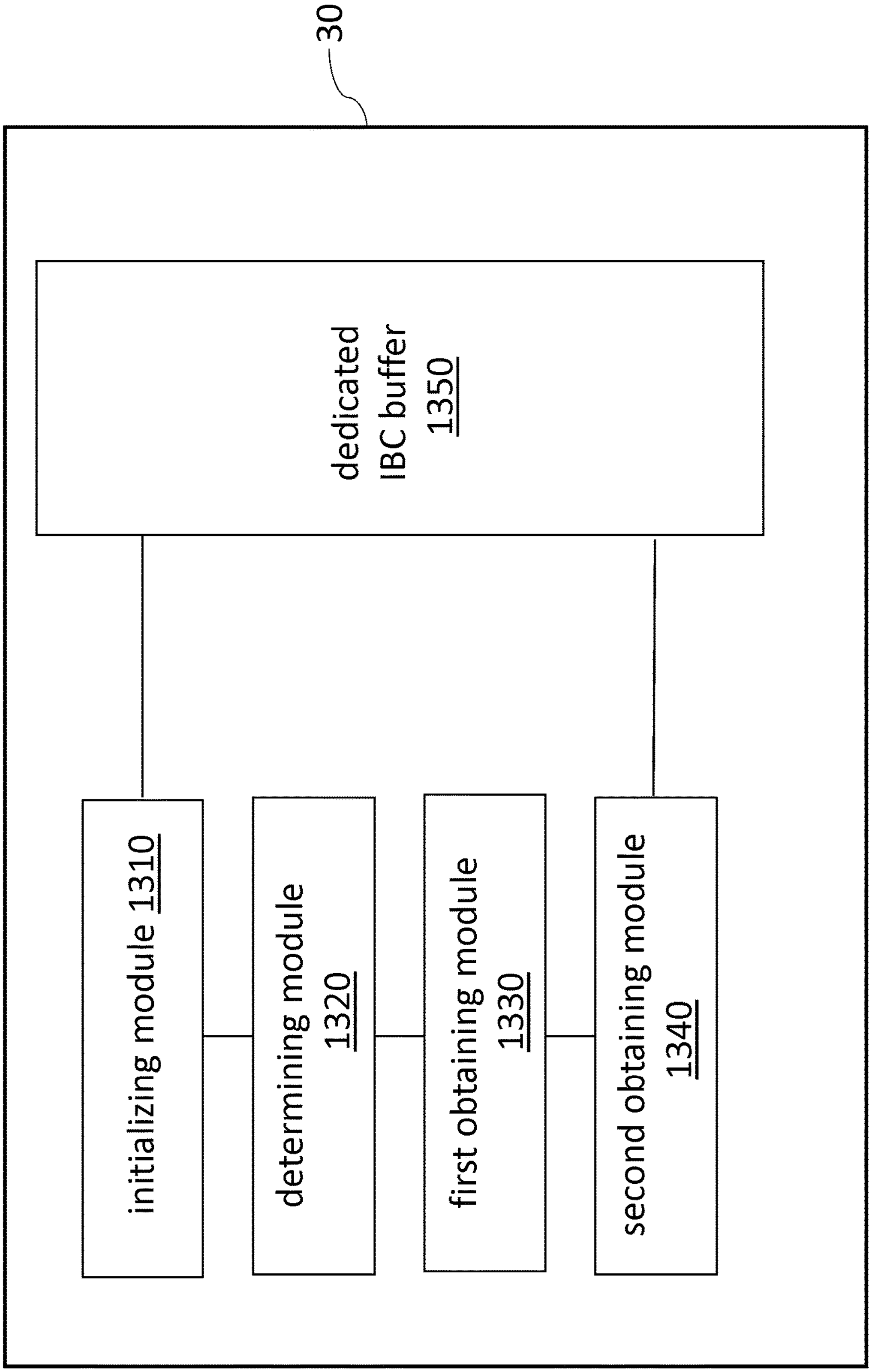
FIG. 16 shows a block diagram illustrating an example of a decoding apparatus according to an embodiment of the disclosure.

FIG. 16 shows a block diagram illustrating an example of a decoding apparatus according to an embodiment of the disclosure. The decoding apparatus (30) comprises a dedicated buffer (1350) for intra block copy (IBC) referencing, an initializing module (1310) configured to initialize the dedicated buffer to a default value, a determining module (1320) configured to determine whether the current block is predicted using IBC mode, a first obtaining module (1330) configured to obtain an IBC block vector for the current block when the current block is predicted using IBC mode, and a second obtaining module (1340) configured to obtain predicted sample values for the current block, based on reference samples from the dedicated buffer and the IBC block vector for the current block. The initializing module (1310) may be configured to initialize the dedicated buffer when a current coding tree unit (CTU) is the first CTU in a CTU row. Alternatively or additionally, the dedicated buffer may be initialized when the current CTU is the first CTU in a picture. Alternatively or additionally, the dedicated buffer may be initialized when a current block to be decoded is a first coding block of a first coding tree unit (CTU) in a CTU row and/or in the current frame. Alternatively or additionally, the initializing module (1310) may be configured to initialize the dedicated buffer for an area of a CTU, when a current coding block to be decoded is a first coding block in the area of the CTU.

Figure 17:
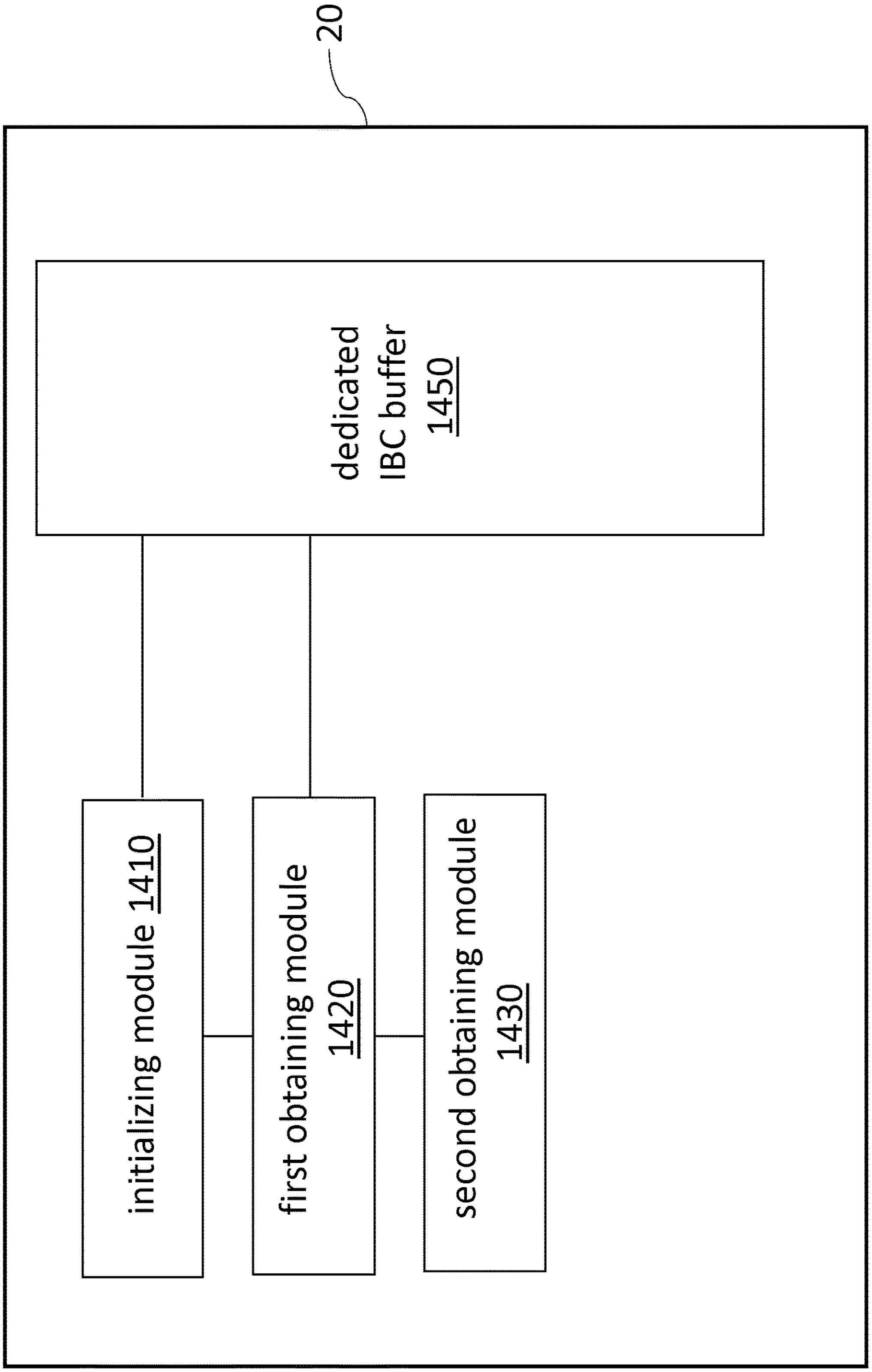
FIG. 17 shows a block diagram illustrating an example of an encoding apparatus according to an embodiment of the disclosure.

FIG. 17 shows a block diagram illustrating an example of an encoding apparatus according to an embodiment of the disclosure. The encoding apparatus (20) comprises a dedicated buffer (1450) for intra block copy (IBC) referencing, an initializing module (1410) configured to initialize the dedicated buffer to a default value, a first obtaining module (1420) configured to obtain predicted sample values for the current block, based on reference samples from the dedicated buffer, and a second obtaining module (1430) configured to obtain an IBC block vector for the current block, based on the predicted sample values for the current block. The initializing module (1410) may be configured to initialize the dedicated buffer when a current coding tree unit (CTU) is the first CTU in a CTU row. Alternatively or additionally, the dedicated buffer may be initialized when the current CTU is the first CTU in a picture. Alternatively or additionally, the dedicated buffer may be initialized when a current block to be encoded is a first coding block of a first coding tree unit (CTU) in a CTU row and/or in the current frame. Alternatively or additionally, the initializing module (1410) may be configured to initialize the dedicated buffer for an area of a CTU, when a current coding block to be encoded is a first coding block in the area of the CTU.

The initializing modules 1310 and 1410, the determining module 1320, the first obtaining modules 1330 and 1420, and the second obtaining modules 1340 and 1430 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The dedicated buffers 1350 and 1450 may be implemented in any computer-readable storage media such as RAM, ROM, EEPROM, CD-ROM or other optical disk storage, magnetic disk storage, or other magnetic storage devices, flash memory, or any other medium that can be used to store desired data structures and that can be accessed by a computer. The dedicated buffers may be provided as a separate memory devices and/or as part of processing circuitry such as a CPU, a GPU or a DSP. The dedicated buffers may be formed by any of a variety of memory devices, such as dynamic random access memory (DRAM), including synchronous DRAM (SDRAM), magnetoresistive RAM (MRAM), resistive RAM (RRAM), or other types of memory devices.

Figure 18:
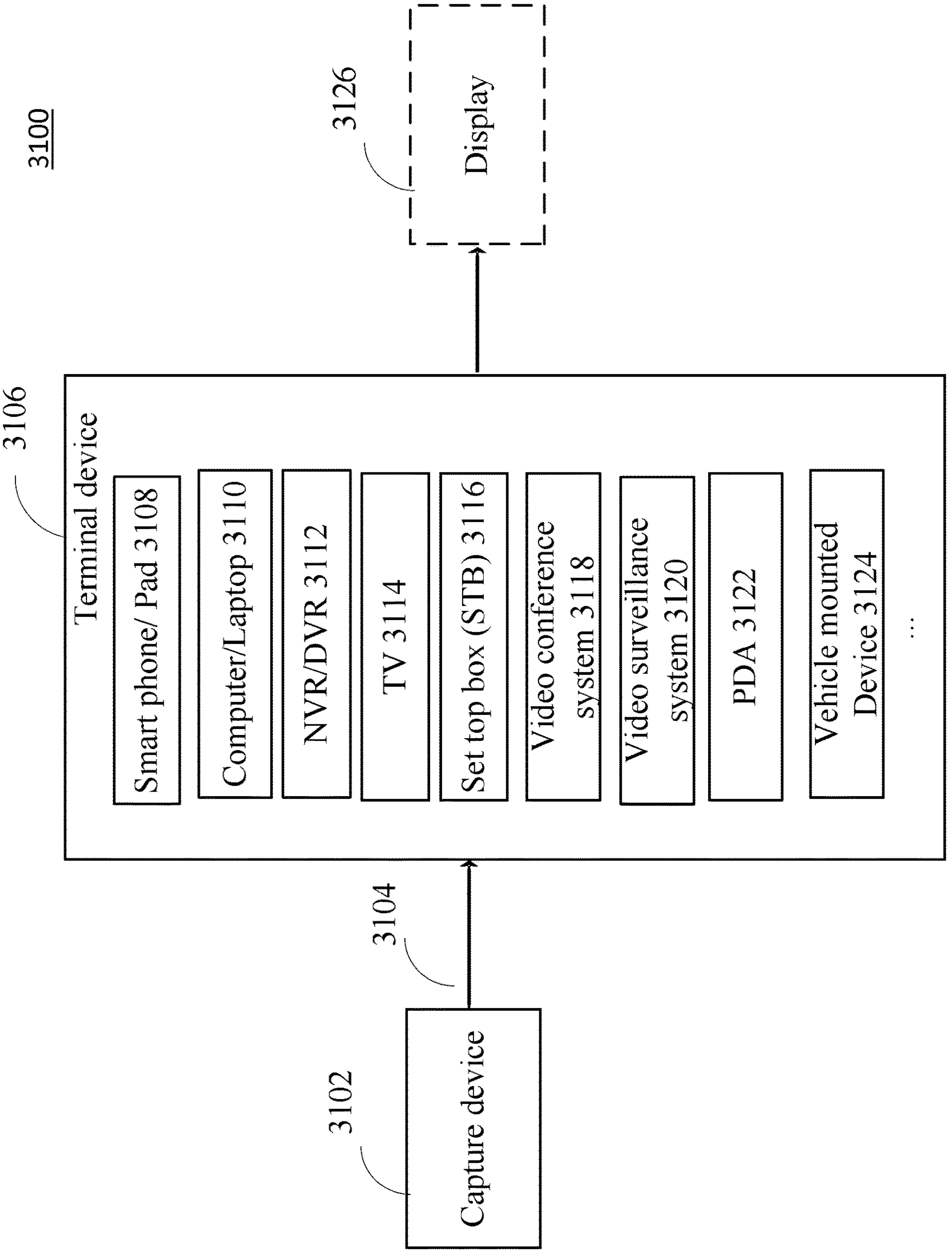
FIG. 18 is a block diagram showing an example structure of a content supply system which realizes a content delivery service.

FIG. 18 is a block diagram showing a content supply system 3100 for realizing a content distribution service. This content supply system 3100 includes a capture device 3102, a terminal device 3106, and optionally includes a display 3126. The capture device 3102 communicates with the terminal device 3106 over communication link 3104. The communication link may include the communication channel 13 described above. The communication link 3104 includes but is not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but is not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 may distribute the encoded audio data and the encoded video data to the terminal device 3106 separately.

In the content supply system 3100, the terminal device 3106 receives and reproduces the encoded data. The terminal device 3106 may be a device with data receiving and recovering capability, such as a smart phone or Pad 3108, a computer or laptop 3110, a network video recorder (NVR)/digital video recorder (DVR) 3112, a TV 3114, a set top box (STB) 3116, a video conference system 3118, a video surveillance system 3120, a personal digital assistant (PDA) 3122, a vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, a smart phone or Pad 3108, a computer or laptop 3110, a network video recorder (NVR)/digital video recorder (DVR) 3112, a TV 3114, a personal digital assistant (PDA) 3122, or a vehicle mounted device 3124, the terminal device can feed the decoded data to its display. For a terminal device equipped with no display, for example, an STB 3116, a video conference system 3118, or a video surveillance system 3120, an external display 3126 may be contacted therein to receive and show the decoded data.

When each device in this system performs encoding or decoding, the picture encoding device or the picture decoding device, as shown in the above-mentioned embodiments, can be used.

Figure 19:
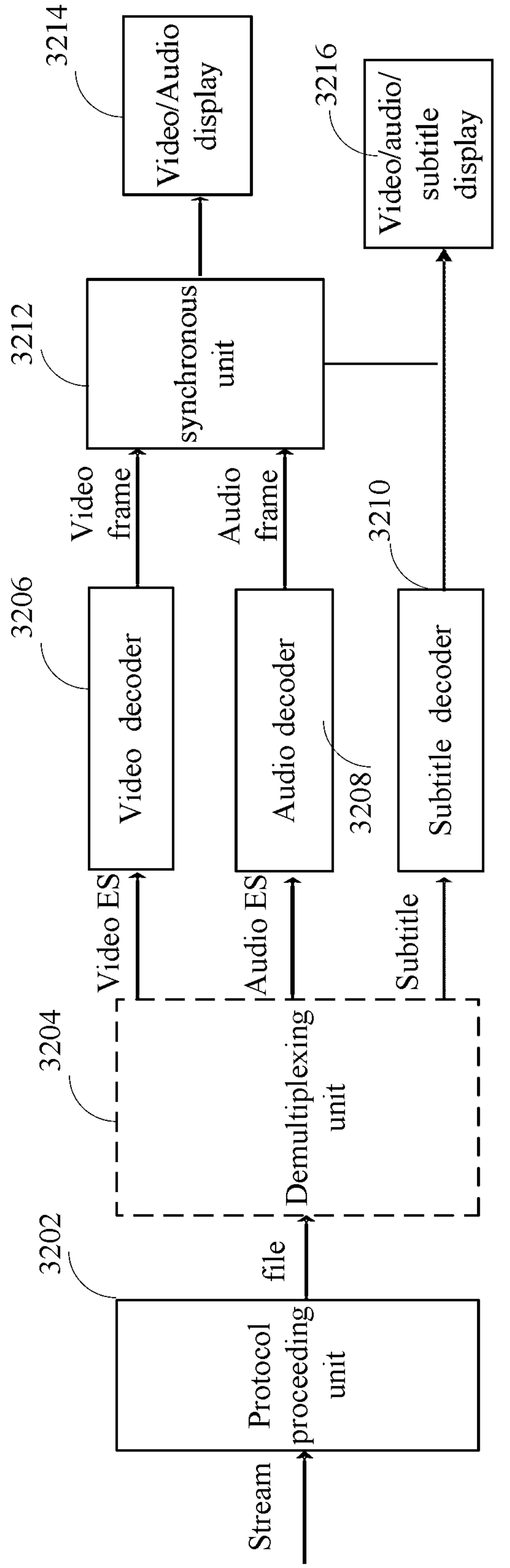
FIG. 19 is a block diagram showing a structure of an example of a terminal device.

FIG. 19 is a diagram showing a structure of an example of the terminal device 3106. After the terminal device 3106 receives a stream from the capture device 3102, the protocol proceeding unit 3202 analyzes the transmission protocol of the stream. The protocol includes but is not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, a stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without passing through the demultiplexing unit 3204.

Via the demultiplexing processing, a video elementary stream (ES), an audio ES, and optionally a subtitle are generated. The video decoder 3206, which includes the video decoder 30 as explained in the above mentioned embodiments, decodes the video ES by the decoding method as shown in the above-mentioned embodiments to generate a video frame, and feeds this data to the synchronous unit 3212. The audio decoder 3208, decodes the audio ES to generate an audio frame, and feeds this data to the synchronous unit 3212. Alternatively, the video frame may be stored in a buffer (not shown in FIG. 19) before feeding it to the synchronous unit 3212. Similarly, the audio frame may be stored in a buffer (not shown in FIG. 19) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

Embodiments disclosed herein are not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, i.e. "the first" is equivalent to the 0-th, "the second" is equivalent to the 1st, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== Equal to

!= Not equal to

≙ defined as

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

— Decrement, i.e., x— is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$Abs(s) = \begin{cases} x; & x>=0 \\ -x; & x<0 \end{cases}$$

A sin(x) the trigonometric inverse sine function, operating on an argument x that is in the range of −1.0 to 1.0, inclusive, with an output value in the range of −π÷2 to π÷2, inclusive, in units of radians.

A tan(x) the trigonometric inverse tangent function, operating on an argument x, with an output value in the range of −π÷2 to π÷2, inclusive, in units of radians.

$$\text{Atan2}(y, x) = \begin{cases} Atan\left(\frac{y}{x}\right); & x>0 \\ Atan\left(\frac{y}{x}\right)+\pi; & x<0 \ \&\& \ y>=0 \\ Atan\left(\frac{y}{x}\right)-\pi; & x<0 \ \&\& \ y<0 \\ +\frac{\pi}{2}; & x==0 \ \&\& \ y>=0 \\ -\frac{\pi}{2}; & \text{otherwise} \end{cases}$$

Ceil(x) the smallest integer greater than or equal to x.

$\text{Clip1}_Y(x)=\text{Clip3}(0, (1<<\text{BitDepth}_Y)-1, x)$ $\text{Clip1}_C(x)=\text{Clip3}(0, (1<<\text{BitDepth}_C)-1, x)$ $$Clip3(x, y, z) = \begin{cases} x; & z<x \\ y; & z>y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c+d; & b-a>=d/2 \\ c-d; & a-b>d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x<=y \\ y; & x>y \end{cases}$$

-continued $$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) operations (with operands x, y, and z) |
|---|
| "x++", "x− −" |
| "!x", "−x" (as a unary prefix operator) |
| $x^y$ |
| $"x*y"$, $"x/y"$, $"x \div y"$, $"\frac{x}{y}"$, $"x \% y"$ |
| "x + y", "x − y" (as a two-argument operator), |
| $"\sum_{i=x}^{y} f(i)"$ |
| "x << y", "x >> y" |
| "x < y", "x <= y", "x > y", "x >= y" |
| "x = = y", "x != y" |
| "x & y" |
| "x \| y" |
| "x && y" |
| "x \| \| y" |
| "x ? y : z" |
| "x . . . y" |
| "x = y", "x += y", "x −= y" |

Text Description of Logical Operations

In the text, a statement of logical operations as would be described mathematically in the following form:

```
if( condition 0 )
   statement 0
else if( condition 1 )
   statement 1
...
else /* informative remark on remaining condition */
   statement n
may be described in the following manner:
... as follows /... the following applies:
- If condition 0, statement 0
- Otherwise, if condition 1, statement 1
- ...
- Otherwise (informative remark on remaining condition), statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " may always be an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
   statement 0
else if( condition 1a || condition 1b)
   statement 1
...
else
   statement n
may be described in the following manner:
   ... as follows /... the following applies:
- If all of the following conditions are true, statement 0:
- condition 0a
- condition 0b
- Otherwise, if one or more of the following
conditions are true, statement 1:
- condition 1a
- condition 1b
- ...
- Otherwise, statement n
```

In the text, a statement of logical operations as would be described mathematically in the following form:

```
if(condition 0)
   statement 0
if(condition 1)
   statement 1
```

may be described in the following manner:

When condition 0, statement 0

When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and the video decoder 30 may equally be used for still picture processing, e.g. residual calculation 204/304, transform 206, quantization 208, inverse quantization 210/310, (inverse) transform 212/312, partitioning 262, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which correspond to tangible media such as data storage media, or communication media including any medium that facilitates transfer of a computer program from one place to another, e.g., according to a communication protocol. In this manner, computer-readable media generally may correspond to (1) tangible computer-readable storage media which are non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of video coding by an encoding device, the method comprising:

initializing a dedicated buffer for intra block copy (IBC) referencing when a current block is the first decoding block in the current coding tree unit (CTU), where the current CTU is the first CTU of the CTU row;

determining the current block in a current coding tree block (CTB) is predicted using an IBC mode;

obtaining an IBC block vector for the current block when the current block is predicted using the IBC mode, wherein when the chroma component of the current block is predicted using the IBC mode and the collocated luma component of the current block is not used when predicting in the IBC mode, the IBC block vector of the chroma component of the current block is set as the default block vector;

the current block includes at least two sub-blocks, wherein when the chroma component of the sub-block is predicted using the IBC mode and the collocated luma component of the sub-block is not predicted using the IBC mode, the IBC block vector of the chroma component of the sub-block is set as the default block vector, and the default block vector is (0,0);

setting the default block vector to the IBC block vector of the collocated center luma sample of the current block when the collocated center luma sample of the current block is predicted using the IBC mode;

obtaining the predicted sample value of the current block according to the reference sample in the dedicated buffer and the IBC block vector of the current block;

obtaining the reconstructed sample of the current block according to the predicted sample value of the current block; and updating the dedicated buffer according to the reconstructed samples of the current block.

2. The method of claim 1, wherein initializing the dedicated buffer comprises initializing the reference samples in the dedicated buffer to a default value.

3. The method of claim 2, wherein the default value is −1.

4. A non-transitory computer-readable media storing computer instructions that configure at least one processor, upon execution of the instructions, to perform the following steps:

initializing a dedicated buffer for intra block copy (IBC) referencing when a current block is the first decoding block in the current coding tree unit (CTU), where the current CTU is the first CTU of the CTU row;

determining the current block in a current coding tree block (CTB) is predicted using an IBC mode;

obtaining an IBC block vector for the current block when the current block is predicted using the IBC mode, wherein when the chroma component of the current block is predicted using the IBC mode and the collocated luma component of the current block is not used when predicting in the IBC mode, the IBC block vector of the chroma component of the current block is set as the default block vector;

the current block includes at least two sub-blocks, wherein when the chroma component of the sub-block is predicted using the IBC mode and the collocated luma component of the sub-block is not predicted using the IBC mode, the IBC block vector of the chroma component of the sub-block is set as the default block vector, and the default block vector is (0,0);

setting the default block vector to the IBC block vector of the collocated center luma sample of the current block when the collocated center luma sample of the current block is predicted using the IBC mode;

obtaining the predicted sample value of the current block according to the reference sample in the dedicated buffer and the IBC block vector of the current block;

obtaining the reconstructed sample of the current block according to the predicted sample value of the current block; and updating the dedicated buffer according to the reconstructed samples of the current block.

5. The non-transitory computer-readable media of claim 4, wherein initializing the dedicated buffer comprises initializing the reference samples in the dedicated buffer to a default value.

6. The non-transitory computer-readable media of claim 5, wherein the default value is −1.

7. A video encoder, comprising:

a memory storing instructions; and at least one processor in communication with the memory, the at least one processor configured, upon execution of the instructions, to perform the following steps:

initializing a dedicated buffer for intra block copy (IBC) referencing when a current block is the first decoding block in the current coding tree unit (CTU), where the current CTU is the first CTU of the CTU row;

determining the current block in a current coding tree block (CTB) is predicted using an IBC mode;

obtaining an IBC block vector for the current block when the current block is predicted using the IBC mode, wherein when the chroma component of the current block is predicted using the IBC mode and the collocated luma component of the current block is not used when predicting in the IBC mode, the IBC block vector of the chroma component of the current block is set as the default block vector;

the current block includes at least two sub-blocks, wherein when the chroma component of the sub-block is predicted using the IBC mode and the collocated luma component of the sub-block is not predicted using the IBC mode, the IBC block vector of the chroma component of the sub-block is set as the default block vector, and the default block vector is (0,0);

setting the default block vector to the IBC block vector of the collocated center luma sample of the current block when the collocated center luma sample of the current block is predicted using the IBC mode;

obtaining the predicted sample value of the current block according to the reference sample in the dedicated buffer and the IBC block vector of the current block;

obtaining the reconstructed sample of the current block according to the predicted sample value of the current block; and updating the dedicated buffer according to the reconstructed samples of the current block.

8. The encoder of claim 7, wherein initializing the dedicated buffer comprises initializing the reference samples in the dedicated buffer to a default value.

9. The encoder of claim 7, wherein the default value is −1.

* * * * *